(12) United States Patent
Li et al.

(10) Patent No.: US 12,442,713 B2
(45) Date of Patent: Oct. 14, 2025

(54) SYSTEM FOR IN-LINE INSPECTION OF SEAL INTEGRITY

(71) Applicant: Cryovac, LLC, Charlotte, NC (US)

(72) Inventors: Honglei Li, Huntersville, NC (US); Kalpit Shailesh Mehta, Charlotte, NC (US); Solomon Bekele, Charlotte, NC (US); Dewitt Jones, Greer, SC (US); Marshall Hewitt, Charlotte, NC (US)

(73) Assignee: Cryovac, LLC, Charlotte, NC (US)

( * ) Notice: Subject to any disclaimer, the term of this patent is extended or adjusted under 35 U.S.C. 154(b) by 314 days.

(21) Appl. No.: 17/602,080

(22) PCT Filed: Apr. 10, 2020

(86) PCT No.: PCT/US2020/027592
§ 371 (c)(1),
(2) Date: Oct. 7, 2021

(87) PCT Pub. No.: WO2020/210574
PCT Pub. Date: Oct. 15, 2020

(65) Prior Publication Data
US 2022/0214243 A1    Jul. 7, 2022

Related U.S. Application Data

(60) Provisional application No. 62/832,573, filed on Apr. 11, 2019.

(51) Int. Cl.
*G01M 3/38* (2006.01)
*G01N 21/88* (2006.01)
*G01N 21/90* (2006.01)

(52) U.S. Cl.
CPC .......... *G01M 3/38* (2013.01); *G01N 21/8806* (2013.01); *G01N 21/90* (2013.01)

(58) Field of Classification Search
CPC .... G01M 3/38; G01M 3/226; G01N 21/8806; G01N 21/90
See application file for complete search history.

(56) References Cited

U.S. PATENT DOCUMENTS 4,278,738 A    7/1981  Brax et al.
6,825,487 B2 * 11/2004  Preece .................. G01N 21/21
                                                      250/559.4
(Continued)

FOREIGN PATENT DOCUMENTS

EP    3128323         2/2017
GB    2507813 A  *  5/2014  ............. G01B 11/00
(Continued)

OTHER PUBLICATIONS

D'huys, Karlien, Wouter Saeys, and Bart De Ketelaere. "Detection of seal contamination in heat-sealed food packaging based on active infrared thermography." Thermosense: Thermal Infrared Applications XXXVII. vol. 9485. SPIE, 2015. (Year: 2015).*

(Continued)

*Primary Examiner* — Gregory A Morse
*Assistant Examiner* — Stefano Anthony Dardano
(74) *Attorney, Agent, or Firm* — Jason R. Womer

(57) ABSTRACT

A process for monitoring seal quality of a packaging article. In one embodiment, the process for monitoring the seal quality includes sealing a film to form packaging article and forming a seal area. The seal area is analyzed by a vision system to acquire image data of the seal area. A vision inspection engine analyzes the image date to determine the continuity of the seal, the strength of the seal, or both.

15 Claims, 24 Drawing Sheets

(56) References Cited

U.S. PATENT DOCUMENTS

| | | | |
|---|---|---|---|
| 7,464,518 B2 * | 12/2008 | Ansinn | B29C 66/91218 |
| | | | 53/551 |
| 2005/0050451 A1 | 3/2005 | Abdollahi et al. | |
| 2006/0048486 A1 * | 3/2006 | Laing | B65D 25/107 |
| | | | 108/51.11 |
| 2006/0244954 A1 * | 11/2006 | Daley | B07C 5/3422 |
| | | | 356/237.1 |
| 2007/0237201 A1 | 10/2007 | Ignatowicz | |
| 2012/0206710 A1 * | 8/2012 | Niemela | G01N 21/41 |
| | | | 356/369 |
| 2015/0241360 A1 | 8/2015 | Niemela et al. | |
| 2016/0258880 A1 * | 9/2016 | Smorgon | H04N 23/56 |
| 2019/0291396 A1 * | 9/2019 | Broadus | B32B 27/306 |
| 2021/0339482 A1 * | 11/2021 | Hallstadius | B29C 66/72328 |

FOREIGN PATENT DOCUMENTS

| | | |
|---|---|---|
| JP | S5951030 | 3/1984 |
| JP | S61274244 | 12/1986 |
| JP | H08184571 | 7/1996 |
| JP | H0972861 | 3/1997 |
| JP | 2000088781 | 3/2000 |
| JP | 2000238724 | 9/2000 |
| JP | 2006143231 A | 6/2006 |
| JP | 2010236896 | 10/2010 |
| JP | 2012225871 | 11/2012 |
| JP | 2013130541 | 7/2013 |
| JP | 2016504574 | 2/2016 |
| JP | 2018127238 | 8/2018 |
| WO | 2008135130 | 11/2008 |
| WO | 2018148371 A1 | 8/2018 |
| WO | 2018150415 | 8/2018 |

OTHER PUBLICATIONS

D'Huys, et al., Detection of seal contamination in heat sealed food packaging based on active infrared thermography, Division MeBioS, Department Biosystems, KU Leuven, Kasteelpark Arenberg 30, B-3001, Heverlee, Belgium Year: 2015.

* cited by examiner

SYSTEM FOR IN-LINE INSPECTION OF SEAL INTEGRITY

BACKGROUND

The subject matter disclosed herein relates to a system and process for inspecting packaging products for quality assurance, to ensure that seal integrity of the packaging product.

Flexible films are frequently used in packaging because they are capable of conforming to surfaces of products. The quality of packaging depends on the quality of the film material and the effective closure of any seals. Adequate seal quality implies the complete fusion of two opposing seal layers. In heat sealing, this fusion is achieved by applying a specific combination of temperature and pressure for a certain period of time, allowing the long chain molecules of the seal layers to join. Seal defects can compromise the seal by an inadequate combination of the sealing parameters or by the presence of water vapor, air bubbles, wrinkles, or product contamination in the seal. Such seal defects can be burnt seals, cold seals, weak seals, pleats, holes, contamination in the seal area, seal burns, seal voids and localized defects. Seal defects can allow air and microorganisms to penetrate the package and spoil enclosed food. They can also negatively impact seal appearance, causing loss of consumer confidence in packaging integrity.

Detection of faulty seals remains today as a labor-intensive, offline, destructive process. Current seal test methods are described in ASTM F1921 "Standard Test Methods for Hot Seal Strength (Hot Tack) of Thermoplastic Polymers and Blends Comprising the Sealing Surfaces of Flexible Webs," ASTM F88 "Standard Test Method for Seal Strength of Flexible Barrier Materials," ASTM F2054 "Standard Test Method for Burst Testing of Flexible Package Seals Using Internal Air Pressurization Within Restraining Plates," and ASTM F2095 "Standard Test Methods for Pressure Decay Leak Test for Flexible Packages With and Without Restraining Plates." Traditional test methods are destructive and can only be performed offline. In addition, these processes only allow the testing of a limited number of packaging articles (such as less than 1%) and result in the destruction of the packaging article.

It would be desirable to be able to check packaging product seals in a non-destructive process. It would further be desirable to be able check seals in-line with the manufacture of the packaging product or with packaging of an article within the packaging product prior to pack off of the packaging product.

The discussion above is merely provided for general background information and is not intended to be used as an aid in determining the scope of the claimed subject matter.

BRIEF SUMMARY

A process for monitoring seal quality of a packaging article. In one embodiment, the process for monitoring the seal quality includes sealing a film to form packaging article and forming a seal area. The seal area is analyzed by a vision system to acquire image data of the seal area. A vision inspection engine analyzes the image data to determine the continuity of the seal, the strength of the seal, or both.

In one exemplary embodiment, a process for monitoring seal quality of a packaging article is disclosed. The process for monitoring seal quality of a packaging article comprises A) sealing a film to itself, another film, or a packaging support to form a packaging article by forming at least one seal area;

B) acquiring image data of the at least one seal area with a vision system comprising an image capture device;

C) assessing the image data of the seal area with a vision inspection engine to verify the continuity of the seal, the strength of the seal, or both the continuity and strength of the seal area.

In an exemplary embodiment the forming of the at least one seal area is formed by a heat generated seal.

In an exemplary embodiment the heat generated seal is a non-linear seal.

In an exemplary embodiment the heat generated seal is selected from the group consisting of an impulse seal, an ultrasonic seal, a laser seal and a heat seal.

In an exemplary embodiment the film comprises at least one layer containing a fluorescence-based indicator.

In an exemplary embodiment the vision system further comprising a blue band pass filter.

In an exemplary embodiment the the vision system is an ultraviolet vision system further comprising an ultraviolet light source.

In an exemplary embodiment the ultraviolet vision system further comprises a white light source.

In an exemplary embodiment the ultraviolet vision system illuminates the white light source and the ultraviolet light source in a variable pattern.

In an exemplary embodiment the image capture device is capable of capturing visual images in the visual spectrum.

In an exemplary embodiment the process for monitoring seal quality of a packaging article further comprises the steps of:

A) exposing the packaging article to incident radiation to excite the fluorescence-based indicator so that the fluorescence-based indicator fluoresces;

B) acquiring image data of the fluorescence emitted from the seal area by the packaging article, while the indicator is fluorescing.

In an exemplary embodiment the fluorescence-based indicator comprises at least one member selected from the group consisting of ultraviolet-indicator, infrared-indicator, dye, pigment, optical brightener, fluorescent whitening agent, 2,2'-(2,5-thiophenylenediyl)bis(5-tert-butylbenzoxazole), hydroxyl-4-)p-tolylamino)anthracene-9,10-dione, 2,5-thiophenediylbis(5-tert-butyl-1,3-benzoxazole), and anthraquinone dyestuff.

In an exemplary embodiment the fluorescence-based indicator is present in at least one layer of the film, with the fluorescence-based indicator being present at a level of from 0.5 to 1000 ppm, based on layer weight.

In an exemplary embodiment the fluorescence-based indicator is present in at least one layer of the film, with the fluorescence-based indicator being present at a level of from 5 to 10 ppm, based on layer weight.

In an exemplary embodiment the vision inspection engine comprises a computing apparatus comprising computer executable instructions configured to determine whether fluorescent electromagnetic energy emitted by the excited fluorescence-based indicator is indicative of a defective seal.

In an exemplary embodiment the computer executable instructions comprise an artificial intelligent algorithm.

In an exemplary embodiment the artificial intelligent algorithm with a training set of training packaging articles before analyzing the image data.

In an exemplary embodiment determining that the seal is defective comprises determining that the film exhibits a higher or lower intensity of fluorescence in a first region of the seal, relative to a second region of the seal.

In an exemplary embodiment determining that the seal is defective comprises determining that the film exhibits a higher or lower intensity of fluorescence in a first region of the seal, relative to an expected level fluorescence.

In an exemplary embodiment determining that the seal is defective comprises determining at least one of (i) that the film exhibits a higher or lower intensity of fluorescence in a first region of the seal, relative to a second region of the seal, (ii) that the film exhibits a higher or lower intensity of fluorescence in a first region of the seal, relative to an expected level fluorescence, or (iii) both (i) and (ii).

In an exemplary embodiment the image data is time-delayed thermography data captured at a time after the forming of at least one seal area.

In an exemplary embodiment the vision system is a thermography vision system comprising an infrared imaging device capable of capturing a temperature distribution based on the amount of infrared radiation emitted from the seal area.

In an exemplary embodiment the image data is taken between 2 and 30 seconds after the forming at least one seal area.

In an exemplary embodiment the image data is taken between 5 and 20 seconds after the forming at least one seal area.

In an exemplary embodiment the process further comprises an active cooling system.

In an exemplary embodiment the vision inspection engine comprises a computing apparatus comprising computer executable instructions configured to determine whether thermal image data captured of the seal is indicative of a defective seal.

In an exemplary embodiment the computer executable instructions comprise an artificial intelligent algorithm.

In an exemplary embodiment the process further comprises generating the artificial intelligent algorithm with a training set of training packaging articles before analyzing the image data.

In an exemplary embodiment determining that the seal is defective comprises determining that the film exhibits a higher or lower thermal temperature in a first region of the seal, relative to a second region of the seal.

In an exemplary embodiment the vision system is a photoelasticity vision system comprising:
(i) a first linear polarizer having a direction of polarization oriented in a first direction;
(ii) a second linear polarizer have a direction of polarization oriented orthogonal to the first direction;
(iii) a light source; and
(iv) an imaging device.

In an exemplary embodiment the first linear polarizer is integrated into the light source.

In an exemplary embodiment the second linear polarizer is integrated into the imaging device.

In an exemplary embodiment the light source is a white light source having a wavelength spectrum from 400 nm to 700 nm.

In an exemplary embodiment the white light source is a diffused white light source.

In an exemplary embodiment the process further comprises a light diffuser positioned between the light source and the packaging article.

In an exemplary embodiment the acquiring of photoelasticity image data is performed in-line with the forming of the packaging article.

In an exemplary embodiment the vision system is a first vision system and further comprising second vision system distinct from the first vision system.

In an exemplary embodiment the first vision system is a thermography vision system comprising an infrared imaging device; and the second vision system is a photoelasticity vision system comprising:
(i) a first linear polarizer having a direction of polarization oriented in a first direction;
(ii) a second linear polarizer have a direction of polarization oriented orthogonal to the first direction;
(iii) a light source; and
(iv) an image capture device.

In an exemplary embodiment the process further comprises a third vision system, the third vision system being an ultraviolet vision system comprising an ultraviolet light source.

In an exemplary embodiment the first vision system is a thermography vision system comprising an infrared imaging device; and the second vision system is an ultraviolet vision system comprising an ultraviolet light source.

In an exemplary embodiment the process further comprises a third vision system, the third vision system is a photoelasticity vision system comprising:
(i) a first linear polarizer having a direction of polarization oriented in a first direction;
(ii) a second linear polarizer have a direction of polarization oriented orthogonal to the first direction;
(iii) a light source; and
(iv) an image capture device.

In an exemplary embodiment the first vision system is an ultraviolet vision system comprising an ultraviolet light source; and the second vision system is a photoelasticity vision system comprising:
(i) a first linear polarizer having a direction of polarization oriented in a first direction;
(ii) a second linear polarizer have a direction of polarization oriented orthogonal to the first direction;
(iii) a light source; and
(iv) an image capture device.

In an exemplary embodiment the process further comprises a third vision system, the third vision system is a thermography vision system comprising an infrared imaging device.

In an exemplary embodiment the vision inspection engine comprises a computing apparatus comprising computer executable instructions configured to determine whether visual image data captured of the seal is indicative of a defective seal.

In an exemplary embodiment the film has a total free shrink in either the machine or traverse direction at 85° C., of less than 10 percent.

In an exemplary embodiment the film has a total free shrink in either the machine or traverse direction at 85° C., of at least 10 percent.

In an exemplary embodiment determining that the seal is defective is indicative of at least one of a gap in a seal of the packaging article, a pleat in the seal of the packaging article, a weak seal or a cold seal.

In an exemplary embodiment the product is a food product.

In an exemplary embodiment the food product comprises at least one member selected from the group consisting of meat and cheese.

In an exemplary embodiment the film is a monolayer film.

In an exemplary embodiment the film is a multilayer film.

In an exemplary embodiment the multilayer film comprises a functional layer; and wherein the fluorescence-based indicator is present in the functional layer.

In an exemplary embodiment the functional layer is a member selected from the group consisting of oxygen barrier layer, organoleptic barrier layer, moisture barrier layer, hazardous chemical barrier layer, microbial barrier layer, acid layer, acid salt layer, bacteriocin layer, bacteriophage layer, metal layer, metal salt layer, natural oil layer, natural extract layer, layer containing polyhexamethylene biguanide hydrochloride, layer containing paraben, layer containing grafted silane-quaternary amine, layer containing triclosan, layer containing zeolite of silver, copper, and/or zinc.

In an exemplary embodiment the functional layer is an oxygen barrier layer comprising at least one member selected from the group consisting of vinylidene chloride copolymer, saponified ethylene/vinyl acetate copolymer, polyamide, polyester, oriented polypropylene, and ethylene homopolymer.

In an exemplary embodiment the multilayer film comprises:
A) a first layer which is a first outer film layer configured to serve as a heat seal layer;
B) a second layer which is a second outer layer configured to serve as an abuse layer;
C) a third layer which is between the first layer and the second layer, wherein the third layer is configured to serve as a functional layer;
D) a fourth layer which is between the first layer and the third layer, wherein the fourth layer is configured to serve as a first tie layer; and
E) a fifth layer which is between the second layer and the third layer, wherein the fifth layer is configured to serve as a second tie layer.

In an exemplary embodiment the packaging article is selected from the group consisting of end-seal bag, side-seal bag, pouch, or backseamed packaging article.

In an exemplary embodiment the preceding claims, wherein in an instance in which a defective seal is detected, the process further comprising generating a signal comprising at least one member selected from the group consisting of an alarm, package flagging, displaying an image of a defective seal, generating a report, marking the packaging article, and diverting the packaging article.

In an exemplary embodiment the at least a portion of the vision system is contained within an enclosure configured to block at least 50% of ambient light.

In an exemplary embodiment the at least a portion of the vision system is contained within an enclosure configured to block at least 85% of ambient light.

In an exemplary embodiment the film is a monolayer film.

In an exemplary embodiment the image data is selected from the group consisting of thermal image data, photoelasticity image data and ultra violet fluorescence emitted image data.

In an exemplary embodiment in an instance in which a defective seal is detected, the process further comprising generating a signal comprising at least one member selected from the group consisting of an alarm, package flagging, displaying an image of a defective seal, generating a report, marking the packaging article, and diverting the packaging article.

In an exemplary embodiment the image data of the at least one seal area is captured by the image capture device at a speed of at least 5 images per second.

In an exemplary embodiment the image data of the at least one seal area is captured by the image capture device at a speed of at least 30 images per second.

In an exemplary embodiment the image data of the at least one seal area is captured by the image capture device at a speed of at least 100 images per second.

In an exemplary embodiment the image data of the at least one seal area is captured by the image capture device at a speed of at least 250 images per second.

In an exemplary embodiment the image data of the at least one seal area is captured by the vision system prior to pack off of a packaged product.

In an exemplary embodiment the vision inspection engine assigns a seal score value to the image data of the seal area.

In an exemplary embodiment the vision inspection engine compares the seal score value of the image data of the seal area with a threshold value.

In an exemplary embodiment the vision inspection engine sends instructions to a seal defect mechanism if the seal score value is beyond a threshold value.

In an exemplary embodiment the vision inspection engine assigns a confidence rating to the seal score value.

In one exemplary embodiment, a system for detecting a defective seal of a packaging article is disclosed. The system for detecting a defective seal of a packaging article comprises
A) a sealing mechanism configured to seal a film to itself, another film, or a packaging support to form a packaging article by forming at least one seal area;
B) a vision system comprising an image capture device configured to acquire image data of the at least one seal area with a vision system;
C) assessing the image data of the seal area with a vision inspection engine to verify the continuity of the seal, the strength of the seal, or both the continuity and strength of the seal area.

In an exemplary embodiment the sealing mechanism forms a heat seal.

In an exemplary embodiment the film comprises at least one layer containing a fluorescence-based indicator.

In an exemplary embodiment the system further comprises a blue band pass filter.

In an exemplary embodiment the vision system is an ultraviolet vision system further comprising an ultraviolet light source.

In an exemplary embodiment the system further comprises:
A) exposing the packaging article to incident radiation to excite the fluorescence-based indicator so that the fluorescence-based indicator fluoresces;
B) acquiring image data of the fluorescence emitted from the seal area by the packaging article, while the indicator is fluorescing.

In an exemplary embodiment the fluorescence-based indicator comprises at least one member selected from the group consisting of ultraviolet-indicator, infrared-indicator, dye, pigment, optical brightener, fluorescent whitening agent, 2,2'-(2,5-thiophenylenediyl)bis(5-tert-butylbenzoxazole), hydroxyl-4-)p-tolylamino)anthracene-9,10-dione, 2,5-thiophenediylbis(5-tert-butyl-1,3-benzoxazole), and anthraquinone dyestuff.

In an exemplary embodiment the vision inspection engine comprises a computing apparatus comprising computer executable instructions configured to determine whether fluorescent electromagnetic energy emitted by the excited fluorescence-based indicator is indicative of a defective seal.

In an exemplary embodiment the computer executable instructions comprise an artificial intelligent algorithm.

In an exemplary embodiment determining that the seal is defective comprises determining that the film exhibits a higher or lower intensity of fluorescence in a first region of the seal, relative to a second region of the seal.

In an exemplary embodiment determining that the seal is defective comprises determining that the film exhibits a higher or lower intensity of fluorescence in a first region of the seal, relative to an expected level fluorescence.

In an exemplary embodiment determining that the seal is defective comprises determining at least one of (i) that the film exhibits a higher or lower intensity of fluorescence in a first region of the seal, relative to a second region of the seal, (ii) that the film exhibits a higher or lower intensity of fluorescence in a first region of the seal, relative to an expected level fluorescence, or (iii) both (i) and (ii).

In an exemplary embodiment the image data is time-delayed thermography data captured at a time after the forming of at least one seal area.

In an exemplary embodiment the vision system is a thermography vision system comprising an infrared imaging device capable of capturing a temperature distribution based on the amount of infrared radiation emitted from the seal area.

In an exemplary embodiment the image data is taken between 2 and 30 seconds after the forming at least one seal area.

In an exemplary embodiment the vision inspection engine comprises a computing apparatus comprising computer executable instructions configured to determine whether thermal image data captured of the seal is indicative of a defective seal.

In an exemplary embodiment determining that the seal is defective comprises determining that the film exhibits a higher or lower thermal temperature in a first region of the seal, relative to a second region of the seal.

In an exemplary embodiment the vision system is a photoelasticity vision system comprising:
(i) a first linear polarizer having a direction of polarization oriented in a first direction;
(ii) a second linear polarizer have a direction of polarization oriented orthogonal to the first direction;
(iii) a light source; and
(iv) an imaging device.

In an exemplary embodiment the image data is selected from the group consisting of thermal image data, photoelasticity image data and ultra violet fluorescence emitted image data.

In an exemplary embodiment the image data of the at least one seal area is captured by the image capture device at a speed of at least 30 images per second.

In an exemplary embodiment the vision inspection engine assigns a seal score value to the image data of the seal area.

In an exemplary embodiment the vision inspection engine compares the seal score value of the image data of the seal area with a threshold value.

In an exemplary embodiment the vision inspection engine assigns a confidence rating to the seal score value.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION

Figure 1:
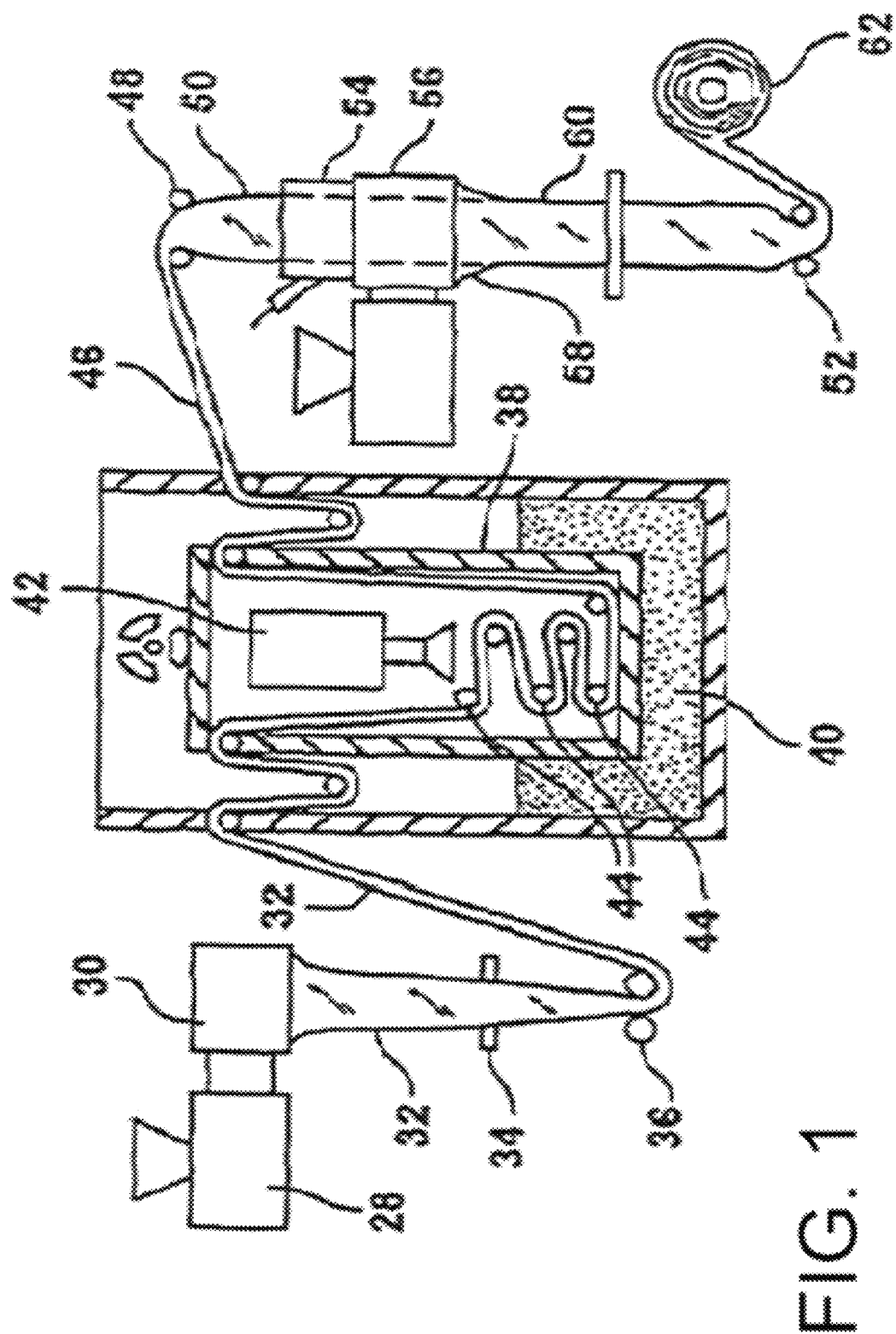
FIG. 1 is a schematic view of a web production process for extruding an annular web to make an annular tape in accordance with some embodiments herein.

Example embodiments will now be described more fully hereinafter with reference to the accompanying drawings, in which some, but not all embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary," as may be used herein, is not provided to convey any qualitative assessment, but instead merely to convey an illustration of an example. Thus, use of any such terms should not be taken to limit the spirit and scope of embodiments of the present invention.

Figure 2:
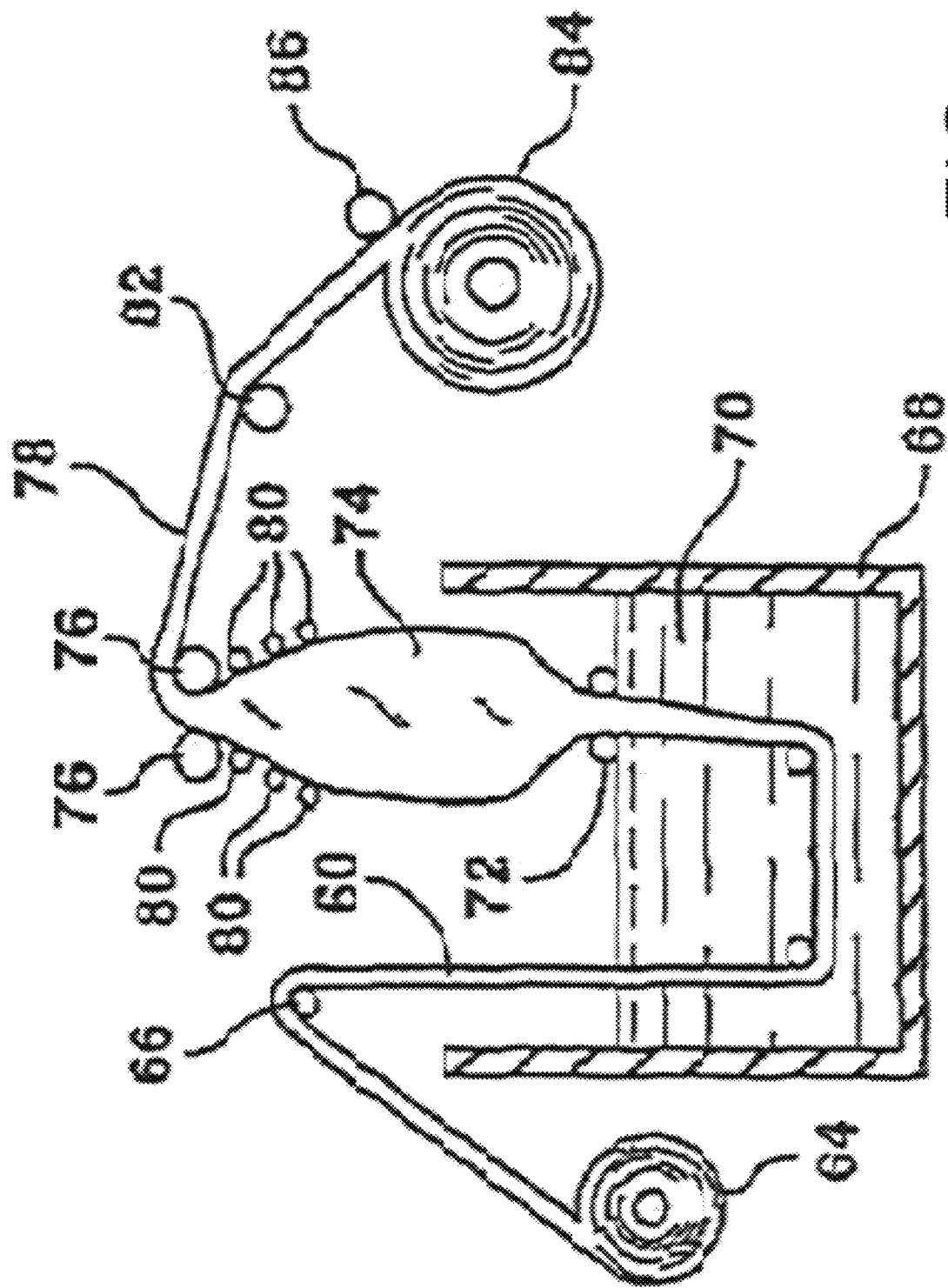
FIG. 2 is a schematic view of a further web production process for converting the annular tape produced in FIG. 1 into an annular film tubing in accordance with some embodiments herein.

Referring to FIGS. 1-2, an exemplary embodiment of forming a packaging article is shown. In some embodiments, the packaging article may be manufactured using any known method provided an indicator as described herein is incorporated into the packaging article. In some embodiments, solid polymer beads (not illustrated) are fed to a plurality of extruders 28 (for simplicity, only one extruder is illustrated). Inside extruders 28, the polymer beads are forwarded, melted, and degassed, following which the resulting bubble-free melt is forwarded into die head 30, and extruded through an annular die, resulting in annular tape 32.

After cooling and quenching by water spray from cooling ring 34, annular tape 32 is collapsed into lay-flat configuration by nip rollers 36. Annular tape 32 in lay-flat configuration is then passed through irradiation vault 38 surrounded by shielding 40, where annular tape 32 is irradiated with high energy electrons (i.e., ionizing radiation) from iron core transformer accelerator 42. Annular tape 32 is guided through irradiation vault 38 on rolls 44.

After irradiation, irradiated annular tape 46 is directed through pre-coating nip rollers 48, following which irradiated annular tape 46 is slightly inflated, resulting in trapped bubble 50. At trapped bubble 50, irradiated annular tape 46 is not significantly drawn longitudinally, as the surface speed of post-coating nip rollers 52 is about the same as the surface speed of pre-coating nip rollers 48. Furthermore, irradiated tape 46 is inflated only enough to place the annular tape into a substantially circular configuration without significant transverse orientation, i.e., without transverse stretching.

Irradiated annular tape 46, slightly inflated by bubble 50, is passed through vacuum chamber 54, and thereafter forwarded through coating die 56. Annular coating stream 58 is melt extruded from coating die 56 and coated onto inflated, irradiated annular tape 46, to form coated annular tape 60. Coating stream 58 comprised an $O_2$-barrier layer made from PVDC, together with additional layers, all of which do not pass through the ionizing radiation. Further details of the above-described coating step are generally as set forth in U.S. Pat. No. 4,278,738, to BRAX et. al., which is hereby incorporated by reference thereto, in its entirety. After irradiation and coating, coated annular tape 60, is wound up onto windup roll 62.

Thereafter, turning to FIG. 2, windup roll 62 is installed as unwind roll 64, on a second stage in the process of making the desired heat-shrinkable film tubing. Coated annular tape 60 is unwound from unwind roll 64, and passed over guide roll 66, after which coated annular tape 60 is passed into hot water bath tank 68 containing hot water 70. Coated tubular film 60, still in lay-flat configuration, is immersed in hot water 70, long enough to bring annular tape 60 up to its softening point, i.e., the desired temperature for biaxial orientation while the coated annular tape is in the solid state.

Thereafter, coated annular tape 60 is directed through nip rolls 72, and bubble 74 is blown, thereby transversely solid state stretching coated annular tape 60. Furthermore, while being blown, i.e., transversely stretched, nip rolls 76 draws annular tape 60 in the longitudinal direction, as nip rollers 76 having a surface speed higher than the surface speed of nip rollers 72. As a result of the transverse stretching and longitudinal drawing, annular tape 60 is biaxially oriented in the solid state to form biaxially-oriented, heat-shrinkable film tubing 78. Heat-shrinkable film tubing 78 is stretched transversely, and drawn longitudinally. While bubble 74 is maintained between pairs of nip rollers 72 and 76, the resulting blown film tubing 78 is collapsed into lay-flat configuration by rollers 80. Film tubing 78 in lay-flat configuration is thereafter conveyed through nip rollers 76 and across guide roll 82, and then rolled onto wind-up roll 84. Idler roll 86 assures a good wind-up.

As used herein, the term "film" is inclusive of plastic web, regardless of whether it is a film, bag or sheet. Multi-layer films as disclosed herein may have a total thickness of up to 0.15 mm. In an embodiment, the multilayer film comprises: A) a first layer which is a first outer film layer and which serves as a heat seal layer; B) a second layer which is a second outer layer and which serves as an abuse layer; C) a third film layer which is between the first layer and the second layer, the third layer serving as a functional layer; D) a fourth film layer which is between the first layer and the third layer, the fourth layer serving as a first tie layer; and E) a fifth film layer which is between the second layer and the third layer, the fifth layer serving as a second tie layer. In some embodiments the film may comprise a first layer, second layer, and third layer as described above, without the first and second tie layers. Function layers include, but are not limited to an oxygen barrier layer, organoleptic barrier layer, moisture barrier layer, hazardous chemical barrier layer, microbial barrier layer, acid layer, acid salt layer, bacteriocin layer, bacteriophage layer, metal layer, metal salt layer, natural oil layer, natural extract layer, layer containing polyhexamethylene biguanide hydrochloride, layer containing paraben, layer containing grafted silane-quaternary amine, layer containing triclosan, layer containing zeolite of silver, copper, and/or zinc.

In an embodiment, the film is adhered to a packaging support such as a tray or another film to form a packaging article. In an embodiment, the packaging article is a member selected from the group consisting of end-seal bag, side-seal bag, pouch, or backseamed packaging article. In some embodiments, the packaging article may be a film container like a bag (e.g., end-seal bag, side-seal bag, etc.) having film surrounding the product. The film may include substantially uniformly distributed fluorescent indicator therein such that the packaged product may indicate gas within the packaging article on all sides of the product. In some embodiments, the packaging article may include a rigid or semi-rigid shell with a film covering or seal enclosing the shell. In an embodiment, the product placed in the packaging article is a food product. In an embodiment, the food product comprises at least one member selected from the group consisting of meat and cheese.

Figure 3:
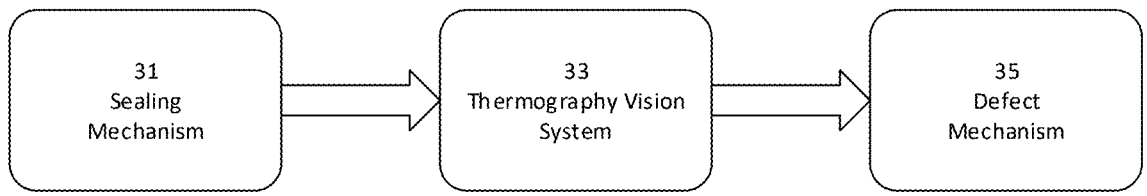
FIG. 3 is a block diagram of an in-line seal defect detection system including a thermal vision system of an embodiment.

Referring now to FIG. 3 is a block diagram of an exemplary process flow for detecting defects in the seal area of a packaging article. A film or packaging article is sealed by a sealing mechanism 31 to create a seal area by sealing the film to itself or another packaging support. In some embodiments, the packaging article may include a film, a pouch, a bag, tubing, rigid or semi-rigid shell or tray with a film covering or seal enclosing the shell or tray. In some embodiments, the packaging article may include a skin pack. The sealing mechanism 31 creates a seal area in the film. The sealing mechanism 31 is a heat generating seal mechanism such as a heating from a seal bar, impulse seal, ultrasonic seal, high speed heat sealing (sealing at least 100 seals per minute) or laser seal. The sealing mechanism seals the film to itself. In the instance of a film tubing as described above, the sealing mechanism seals one end of the tubing to create a packaging article with one opening. It is understood that the sealing mechanism could also seal the sides of the packaging article and may also seal the final opening after a product has been placed in the packaging article.

After sealing of the packaging article, a thermography vision system 33 captures thermographic images of the seal area. Residual heat from the sealing process performed by the sealing mechanism 31 is retained in the seal area. This allows for the capture of thermographic images of the seal area. The thermal image is captured between 2 and 40 seconds after sealing. In an embodiment the thermal image is captured between 5 and 30 seconds after sealing. In an embodiment the thermal image is captured between 10 and 20 seconds after sealing. In an embodiment the thermal image is captured about 15 seconds after sealing. In an embodiment the thermal image is captured about 20 seconds after sealing. It is understood that active cooling systems such as blown air, chilled air, chill chambers and the like can be used to reduce image capture time frames.

Thermography is a contactless, non-destructive testing method in which surface temperature distribution (thermograms) are recorded based on the amount of infrared radiation emitted by the inspected scene. The inspected objects are thermally excited, and the response to this excitation is recorded in time. Active thermography data are three-dimensional since the temperature of each spatial pixel is evaluated in time. Active thermography is used to detect (sub)surface defects based on differences in thermo-physical properties.

The thermography vision system 33 includes at least one thermography image capture device and a vision inspection engine. In some embodiments the thermography vision system 33 includes a light source, a number of light sources (of the same or different types), filters, multiple image capture devices or reflectors. In an embodiment the thermography image capture device is a thermal camera. The light source may be a continuous light source or a flashed light source. The light source may be white light, filtered light, diffused light, infrared light, ultraviolet light, in the visible spectrum or outside of the visible spectrum. In some embodiments the thermography vision system 33 is housed in an enclosure to provide an isolated environment for the image capture device to capture images. The enclosure may isolate or reduce the effect on the imaging area from external sources of light and containments such as dust.

In one embodiment the thermography image capture device captures an image of at least one seal of each packaging article. In another embodiment the thermography image capture device captures at least two images of at least one seal of each packaging article. In another embodiment the thermography image capture device captures at least four images of at least one seal of each packaging article. In one embodiment the thermography image capture device captures image data at a frame rate of at least 20 frames per second. In one embodiment the thermography image capture device captures image data at a frame rate of at least 40 frames per second. In one embodiment the thermography image capture device captures image data at a frame rate of at least 60 frames per second. Having additional image data of the seal provides additional data and may result in more reliable determinations of seal quality. In an embodiment, the thermography image capture device transmits image data in a video format, including but not limited to motion JPEG, MPEG, SEQ and H.264 format. In an embodiment, the thermography image capture device captures thermal image data. In another embodiment, the thermography image capture device captures multi-spectral dynamic image data.

The image data acquired by the thermal imaging device is sent to a vision inspection engine. The vision inspection engine, as described in more detail herein, is capable of analyzing images and determining if a seal is acceptable of if a seal has a defect. The vision inspection engine creates a seal score relating to the quality of the seal area. The vision inspection engine analyzes at least one of color gradient change, light intensity, color intensity, change in data from adjacent pixels, change in data from adjacent sections of pixels and combinations thereof to create a seal score. In an embodiment, the vision inspection engine analyzes at least one of color gradient change, light intensity, color intensity, change in data from adjacent pixels, change in data from adjacent sections of pixels and combinations thereof to further create a confidence score. The confidence score provides an assessment of the reliability of the seal score assigned. The vision inspection engine may be local to the thermography visions system 33, integrated into another part of a system or be remote.

Still referring to FIG. 3, defect mechanism 35 receives instructions to identify a packaging article having a defective seal, or having a confidence rating below a certain threshold. In one embodiment the defect mechanism pulls the defective packaging article from the line for off-line testing, verification, recycling, repacking or waste thereby only allowing packaging articles with adequate seals to continue beyond the defect mechanism 35. In an embodiment the defect mechanism tags, flags or prints at least one indicium on the packaging article to identify the packaging article as potentially having a defective seal. In an embodiment, the detection of a defective seal may result in the defect mechanism activating an alarm, flagging the defective packaging article, displaying an image of the defective seal or packaging article, displaying data pertaining to the defective seal, and generating a report of the defective seal or packaging article. In an embodiment, the defect mechanism removes the packaging article having a defective seal. The defect mechanism may pause the production line while the packaging article is off loaded, or it may remove the packaging article without pausing the production line. In an embodiment, the defect mechanism includes vacuum suction cups utilized in combination with robotic arms to automatically remove package articles. In another embodiment, the defect mechanism moves the packaging to a defect line away from the line packaging articles not having a defective seal.

In an embodiment, a signal in response to the defective seal is generated and activates the alarm, flagging, discontinuity image display, discontinuity data, report of discontinuity data, etc. while the web remains in motion, i.e., instantaneously and online. Alternatively, the signal in response to the defective seal is generated after production is complete, i.e., offline. The signal in response to the discontinuity can include electronic messaging, email, data log, and report.

It is understood that the vision system and defect mechanism may be implemented after the formation of the packaging article and before product packaging. In another embodiment, the vision system and defect mechanism may be implemented after the packaging and sealing of a product in the packaging article.

Figure 4:
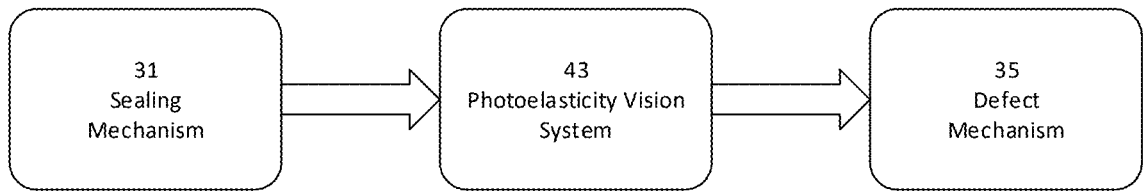
FIG. 4 is a block diagram of an in-line seal defect detection system including a photoelasticity vision system of an embodiment.

Referring now to FIG. 4 is a block diagram of an exemplary process flow for detecting defects in the seal area of a packaging article. A film or packaging article is sealed by a sealing mechanism 31 as described above. The sealing mechanism 31 creates a seal area in the film. The sealing mechanism 31 may be a seal bar heat seal, impulse seal, ultrasonic seal, high speed heat sealing or laser seal. In one embodiment, the sealing mechanism creates at least 100 seals per minute. In another embodiment, the sealing mechanism creates at least 300 seals per minute. The sealing mechanism seals the film to itself. In the instance of a film tubing as described above, the sealing mechanism seals one end of the tubing to create a packaging article with one opening. It is understood that the sealing mechanism could also seal the sides of the packaging article and may also seal the final opening after a product has been placed in the packaging article.

The film is positioned between two cross-polarized filters set orthogonal to each other. The first filter passes light oriented in a first direction. The second filter is oriented orthogonal to the first filter to block all light coming through the first filter. When a piece of transparent material is positioned between the two filters, the light is rotated. The amount of rotation varies with the type of material and the amount of internal strain within the material. With the light rotated out of the polarization plane of the second filter, some light passes through the second filter.

After sealing of the packaging article, a photoelasticity vision system 43 captures images of the seal area. The photoelasticity vision system 43 includes at least one photoelasticity image capture device, a light source, a first polarizing light filter, a second polarizing light filter and a vision inspection engine. In some embodiments the photoelasticity vision system 43 includes a number of light sources (of the same or different types), filters, multiple image capture devices or reflectors. In an embodiment the photoelasticity image capture device is a high speed camera. The light source may be a continuous light source or a flashed light source. The light source may be white light, filtered light, diffused light, infrared light, ultraviolet light, in the visible spectrum or outside of the visible spectrum. In some embodiments the photoelasticity vision system 43 is housed in an enclosure to provide an isolated environment for the image capture device to capture images. The enclosure may isolate or reduce the effect on the imaging area from external sources of light and containments such as dust.

In one embodiment the photoelasticity image capture device captures an image of at least one seal of each packaging article. In another embodiment the photoelasticity image capture device captures at least two images of at least one seal of each packaging article. In another embodiment the photoelasticity image capture device captures at least four images of at least one seal of each packaging article. In one embodiment the photoelasticity image capture device captures image data at a frame rate of at least 20 frames per second. In one embodiment the photoelasticity image capture device captures image data at a frame rate of at least 40 frames per second. In one embodiment the photoelasticity image capture device captures image data at a frame rate of at least 60 frames per second. Having additional image data of the seal provides additional data and may result in more reliable determinations of seal quality. In an embodiment, the ultraviolet image capture device is an RGB camera capable of capturing images in the visible spectrum.

The image data acquired by the photoelasticity imaging device is sent to a vision inspection engine. The vision inspection engine, as described in more detail herein, is capable of analyzing images and determining if a seal is acceptable of if a seal has a defect. In an embodiment, the vision inspection engine determines a confidence rating along with the seal classification. The vision inspection engine may be local to the photoelasticity vision system 43, integrated into another part of a system or be remote. The vision inspection engine analyzes the image for variations in adjacent pixels color gradients, section comparison and the like. The vision inspection engine may compare a number of pixels, or sections of images one or more of the following: mean, variable, skew, minimum, maximum, range or variations in the seal area. Variations between pixels or section of the image can be indicative of a seal defect.

Still referring to FIG. 4, defect mechanism 35 receives instructions to identify a packaging article having a defective seal or having a confidence rating below a certain threshold. In one embodiment the defect mechanism pulls the defective packaging article from the line for off-line testing, verification, recycling, repacking or waste thereby only allowing packaging articles with adequate seals to continue beyond the defect mechanism 35. In an embodiment the defect mechanism tags, flags or prints at least one indicium on the packaging article to identify the packaging article as potentially having a defective seal. In an embodiment, the detection of a defective seal may result in the defect mechanism activating an alarm, flagging the defective packaging article, displaying an image of the defective seal or packaging article, displaying data pertaining to the defective seal, and generating a report of the defective seal or packaging article.

In an embodiment, a signal in response to the defective seal is generated and activates the alarm, flagging, discontinuity image display, discontinuity data, report of discontinuity data, etc. while the web remains in motion, i.e., instantaneously and online. Alternatively, the signal in response to the defective seal is generated after production is complete, i.e., offline. The signal in response to the discontinuity can include electronic messaging, email, data log, and report.

It is understood that the vision system and defect mechanism may be implemented after the formation of the packaging article and before product packaging. In another embodiment, the vision system and defect mechanism may be implemented after the packaging and sealing of a product in the packaging article.

Figure 5:
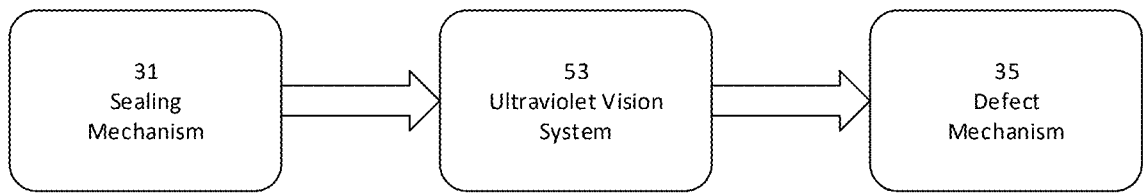
FIG. 5 is a block diagram of an in-line seal defect detection system including an ultraviolet vision system of an embodiment.

Referring now to FIG. 5 is a block diagram of an exemplary process flow for detecting defects in the seal area of a packaging article. A film or packaging article is sealed by a sealing mechanism 31. In some embodiments, the packaging article may include a film, a pouch, a bag, tubing, rigid or semi-rigid shell with a film covering or seal enclosing the shell. In some embodiments, the film may include a detectable component allowing detection seal defects. In some embodiments, the packaging article may include a skin pack. In some embodiments, the film having an ultraviolet ("UV") fluorescence-based indicator may only partially surround the product.

The films include a detectable component such as a fluorescence-based indicator. In an embodiment, the film contains a layer comprising a blend of a polymer and the fluorescence-based indicator in any functional layer in which the concentration of the fluorescent-based indicator is present in the blend in an amount of from about 5 to 50 ppm, based on total layer weight, with the fluorescence-based indicator being uniformly blended with the polymer. The uniformity of the indicator in the indicator/polymer blend refers to the concentration of the indicator in the blend being subject to a variation of not more than 20%, and not less than 20%, based on a target concentration of the indicator in the blend, upon taking 10 random samples, each sample having a size of 10 grams. In an embodiment, the polymer comprises PVDC, i.e., polyvinylidene chloride, ethylene vinyl alcohol or nylon.

The UV fluorescent indicator can be present in the functional layer at any level that is detectable by the detector while allowing the functional layer to maintain its intended function. Too much fluorescent indicator may interfere with layer function. Too little fluorescent indicator may become undetectable to the detector. In an embodiment, the fluorescent indicator may be present at a level of at least 0.5 parts per million (ppm). As used herein, the phrase "part per million" and the equivalent expression "ppm" refer to the weight of the fluorescent indicator versus the total weight of the layer (weight fluorescent indicator+weight of remainder of components in the layer). Of course, the majority component of the layer is one or more thermoplastic polymers which are a solid at room temperature. Both the fluorescent indicator and the thermoplastic polymer of the layer can be solids at room temperature. In an embodiment, the fluorescent indicator can be present at a level of at least 1 ppm, or at least 1.5 ppm, or at least 2 ppm, or at least 3 ppm, or at least 5 ppm, or at least 10 ppm, or at least 20 ppm, or at least 40 ppm, or at least 80 ppm, or at least 120 ppm, or at least 160 ppm, or at least 200 ppm, or at least 300 ppm, or at least 500 ppm. In an embodiment, the fluorescent indicator can be present in the layer at a level of from 0.5 to 40 ppm, or from 1 to 20 ppm, or from 1.5 to 10 ppm, or from 2 to 5 ppm. In order for a film to be suitable for food contact end use, the fluorescent indicator is present in the layer in an amount of not more than 150 ppm.

A UV-based fluorescent indicator is a UV-absorbing compound with distinctive absorption and/or fluorescence properties. Preferred UV-absorbing fluorescent indicator component has a unique optical signature that is not present in nature and not easily confused with signals from natural sources. A preferred UV-fluorescent indicator has multiple unique absorption or fluorescent features in its UV spectra. For example, as used herein, electromagnetic radiation at 375 nanometers was used as incident radiation to excite a fluorescent indicator known as 2,5-thiophenediylbis(5-tert-butyl-1,3-benzoxazole), which is assigned CAS registry number 7128-64-5, and which is also known as: 2,2'-(2,5-thiophenediyl)bis[5-tert-butylbenzoxazole]; 2,5-bis-2(5-tert-butyl-benzoxalyl)thiophene; 2,5-bis(5-t-butyl-2-benzoxazolyl)thiophene; 2,5-bis-(5-t-butylbenzoxazolyl-[2-yl])-thiophene; 2,5-bis-(5-tert-butyl-2-benzoxazol-2-yl) thiophene; 2,5-bis(5'-tert-butyl-2-benzoxazol-2-yl) thiophene; 2,5-bis(5'-tert-butyl-2'-benzoxazolyl)thiophene; 2,5-bis(5-tert-butyl-2-benzoxazolyl)thiophene; 2,5-bis(5-tert-butyl-benzoxazol-2-yl)thiophene; 2,5-bis(5-tert-butyl-benzoxazoyl)-2-thiophene; 2,5-di(5-tertbutylbenzoxazol-2-yl)thiophene; 2,2'-(2,5-thiophenediyl)bis[5-(1,1-dimethylethyl)-benzoxazole; 2,5-bis(5'-tert-butyl-2-benzoxazolyl)thiophene; and 2,5-thiophenediylbis(5-tert-butyl-1,3-benzoxazole). The absorption of the incident radiation at 375 nanometers caused the excited 2,5-thiopbenediylbis(5-tert-butyl-1,3-benzoxazole) optical brightener detectable component to emit radiation at 435 nanometers. The fluorescent indicator was uniformly blended into a PVDC resin which was used to produce an oxygen barrier layer of a multilayer film. Exposing the resulting annular tape and/or heat-shrinkable film tubing to incident radiation at 375 nm excited the 2,5-thiophenediylbis(5-tert-butyl-1,3-benzoxazole) optical brightener to emit radiation at 435 nanometers. The emitted 435 nm radiation was detected by a machine vision system, which revealed the presence, continuity, and thickness of the PVDC barrier layer of the tape and a multilayer film tubing. In an embodiment, the UV-based fluorescent indicator comprises at least one member selected from the group consisting of ultraviolet-indicator, infrared-indicator, dye, pigment, optical brightener, fluorescent whitening agent, 2,2'-(2,5-thiophenylenediyl)bis(5-tert-butylbenzoxazole), hydroxyl-4-)p-tolylamino)anthracene-9,10-dione, 2,5-thiophenediylbis(5-tert-butyl-1,3-benzoxazole), and anthraquinone dyestuff. The indicator is of a type which, if exposed to radiation at a first peak wavelength, emits radiation at a second peak wavelength.

In an embodiment, the detectable component comprises at least one member selected from the group consisting of ultraviolet-indicator, infrared-indicator, dye, pigment, optical brightener, fluorescent whitening agent, and 2,5-thiophenediylbis(5-tert-butyl-1,3-benzoxazole), 2,2'-(2,5-thiophenylenediyl)bis(5-tert-butylbenzoxazole), hydroxyl-4-)p-tolylamino)anthracene-9,10-dione, 2,5-thiophenediylbis(5-tert-butyl-1,3-benzoxazole), and anthraquinone dyestuff.

2,5-Thiophenediylbis(5-tert-butyl-1,3-benzoxazole) is marketed as an optical brightener by a plurality of suppliers, including BASF Corporation (TINOPAL OP® 2,5-thiophenediylbis(5-tert-butyl-1,3-benzoxazole) fluorescent brightening agent) and Mayzo, Inc (BENETEX OB PLUS® 2,5-thiophenediylbis(5-tert-butyl-1,3-benzoxazole) fluorescent brightening agent). The indicator is of a type which, if exposed to radiation at a first peak wavelength, emits radiation at a second peak wavelength.

In an embodiment, the UV-based fluorescent indicator is present in at least one layer of the film, with the indicator being present at a level of from 0.5 to 150 ppm, based on layer weight. In another embodiment, the indicator is present in at least one layer of the film, with the indicator being present at a level of from 1 to 20 ppm, or from 2 to 10 ppm, based on layer weight. In an embodiment, the detectable component is present in a film layer at a level of at least 1 part per million.

In an embodiment, the UV-based fluorescent indicator is of a type which, if exposed to radiation at a first peak wavelength, emits radiation at a second peak wavelength.

Still referencing to FIG. 5, the sealing mechanism 31 creates a seal area in the film. The sealing mechanism 31 seals the film to itself or another packaging article. In an embodiment, the sealing mechanism is a heat generating seal mechanism such as a heating from a seal bar, impulse seal, ultrasonic seal or laser seal. The sealing mechanism seals the film to itself. In the instance of a film tubing as described above, the sealing mechanism seals one end of the tubing to create a packaging article with one opening. It is understood that the sealing mechanism could also seal the sides of the packaging article and may also seal the final opening after a product has been placed in the packaging article.

After sealing of the packaging article, an ultraviolet system 53 captures ultraviolet images of the seal area. The ultraviolet vision system 53 includes at least one ultraviolet image capture device, an ultraviolet light source and a vision inspection engine. In an embodiment, the ultraviolet image capture device is an RGB camera capable of capturing images in the visible spectrum. In some embodiments the ultraviolet vision system 53 includes a number of light sources (of the same or different types), filters, multiple image capture devices or reflectors. The light sources may be a continuous light source or a flashed light source. The additional light source may be white light, filtered light, diffused light, infrared light, ultraviolet light, in the visible spectrum or outside of the visible spectrum. In some embodiments the ultraviolet vision system 53 is housed in an enclosure to provide an isolated environment for the image capture device to capture images. The enclosure may isolate or reduce the effect on the imaging area from external sources of light and containments such as dust. The light source of the ultraviolet vision system 53 excites a detectable component in the seal area of the packaging article. The detectable component allows the image capture device to identify the detectable component.

In an embodiment, the detectable component is a UV fluorescent indicator and at least one of (i) a fluorescent electromagnetic energy intensity is higher in a region where a seal defect is located as compared to an adequate seal, or (ii) a fluorescent electromagnetic energy color shift (downward in energy, i.e., longer wavelength, lower frequency) occurs in a region where a seal defect is located as compared to an adequate seal.

In an embodiment, the fluorescent electromagnetic energy intensity is at least 10% higher in the region where a seal defect is located as relative to an adequate seal. In another embodiment, the fluorescent electromagnetic energy intensity is >15% higher, or >20% higher, or >30% higher, or >40% higher, or >50% higher, or >60% higher in the region wherein a seal defect is located, relative to the intensity of the fluorescent electromagnetic energy in a region in which seal is adequate. Factors that can affect the fluorescence image emitted by the package include, among others: (i) angle of view, (ii) focal distance between imaging device and area of package under consideration, (iii) exposure time, (iv) amount of excitation, and (v) thickness variations in the film, including the increase in thickness at a heat seal of the film to itself or to another film.

In one embodiment the ultraviolet image capture device captures an image of at least one seal of each packaging article. In another embodiment the ultraviolet image capture device captures at least two images of at least one seal of each packaging article. In another embodiment the ultraviolet image capture device captures at least four images of at least one seal of each packaging article. In one embodiment the ultraviolet image capture device captures image data at a frame rate of at least 20 frames per second. In one embodiment the ultraviolet image capture device captures image data at a frame rate of at least 40 frames per second. In one embodiment the ultraviolet image capture device captures image data at a frame rate of at least 60 frames per second. Having additional image data of the seal provides additional data and may result in more reliable determinations of seal quality.

The image data acquired by the ultraviolet imaging device is sent to a vision inspection engine. The vision inspection engine, as described in more detail herein, is capable of analyzing images and determining if a seal is acceptable of if a seal has a defect. In an embodiment, the acquiring of the image data is carried out using an ultraviolet imaging device that generates image data of the fluorescent electromagnetic energy emitted by the excited indicator, with the assessing of the image data being carried out using a vision inspection engine programmed with an algorithm capable of assessing intensity of the fluorescent electromagnetic energy emitted by the excited indicator. In an embodiment, the vision inspection engine determines a confidence rating along with the seal classification. The vision inspection engine may be local to the ultraviolet visions system 33, integrated into another part of a system or be remote.

Still referring to FIG. 5, defect mechanism 35 receives instructions to identify a packaging article having a defective seal, or having a confidence rating below a certain threshold. In one embodiment the defect mechanism pulls the defective packaging article from the line for off-line testing, verification, recycling, repacking or waste thereby only allowing packaging articles with adequate seals to continue beyond the defect mechanism 35. In an embodiment the defect mechanism tags, flags or prints at least one indicium on the packaging article to identify the packaging article as potentially having a defective seal. In an embodiment, the detection of a defective seal may result in the defect mechanism activating an alarm, flagging the defective packaging article, displaying an image of the defective seal or packaging article, displaying data pertaining to the defective seal, and generating a report of the defective seal or packaging article.

In an embodiment, a signal in response to the defective seal is generated and activates the alarm, flagging, discontinuity image display, discontinuity data, report of discontinuity data, etc. while the web remains in motion, i.e., instantaneously and online. Alternatively, the signal in response to the defective seal is generated after production is complete, i.e., offline. The signal in response to the discontinuity can include electronic messaging, email, data log, and report.

It is understood that the vision system and defect mechanism may be implemented after the formation of the packaging article and before product packaging. In another embodiment, the vision system and defect mechanism may be implemented after the packaging and sealing of a product in the packaging article.

Figure 6:
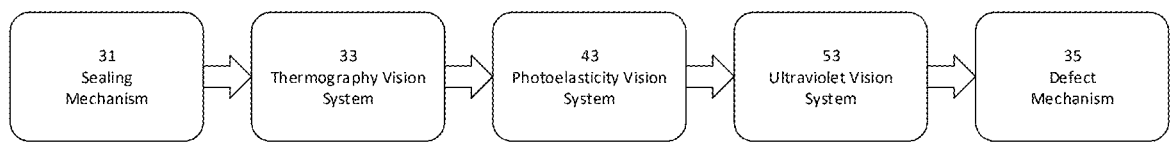
FIG. 6 is a block diagram of an in-line seal defect detection system including a thermal vision system, a photoelasticity vision system and an ultraviolet vision system of an embodiment.

In some embodiments, multiple vision systems are envisioned. The vision systems may be redundant as a similar type of vision system or distinct vision systems utilizing distinct light sources, image capture devices, lighting angles, lighting properties and the like. Referring now to FIG. 6 is a block diagram of an exemplary process flow for detecting defects in the seal area of a packaging article. The process is similar to the embodiments described above in reference to FIGS. 3-5 with the addition of additional vision systems included. The thermography vision system 33, photoelasticity vision system 43 and ultraviolet vision system 53 each send image data to a vision inspection engine. It is understood that a common shared vision inspection engine or multiple vision inspections engines are contemplated. The vision inspection engine is programmed with an algorithm or algorithms capable of assessing thermography images, photoelasticity images and intensity of the fluorescent electromagnetic energy emitted by the excited indicator. The combined image data from the three vision systems result in a higher confidence rating which is sent to the defect mechanism 35. While a thermography vision system 33, photoelasticity vision system 43 and ultraviolet vision system 53 are shown, a system is contemplated that utilizes only two vision systems.

Figure 7:
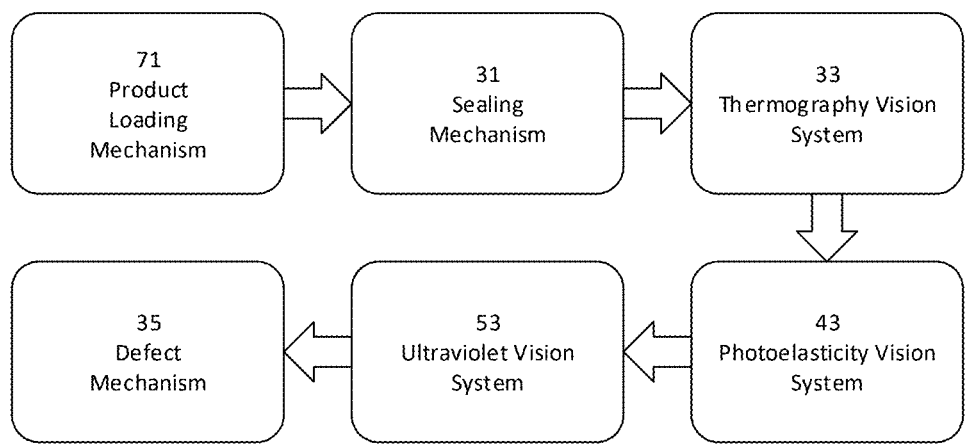
FIG. 7 is a block diagram of a seal defect detection system including a thermal vision system, a photoelasticity vision system and an ultraviolet vision system of an embodiment.

Referring now to FIG. 7 is a block diagram of an exemplary process flow for detecting defects in the seal area of a packaging article after a product is sealed within the packing article. The product loading mechanism loads a product into a packaging article. In one embodiment, the product being a food product. In another embodiment, the product being meet or cheese. After the product is loaded, the sealing mechanism 31 seals the product in the packaging article. In some embodiments, the sealing mechanism includes a vacuum chamber to vacuum seal the product in the packaging article. In an embodiment, the packaging article is shrunk around the product. In an embodiment, the packaging article is a non-shrink packaging article. The seal or seals of the packaging article are then analyzed by the thermography vision system 33, photoelasticity vision system 43 and ultraviolet vision system 53 and vision inspection engine(s) as described more fully herein. The combined image data from the three vision systems result in a higher confidence rating which is sent to the defect mechanism 35. While a thermography vision system 33, photoelasticity vision system 43 and ultraviolet vision system 53 are shown, a system is contemplated that utilizes only two vision systems.

Figure 8:
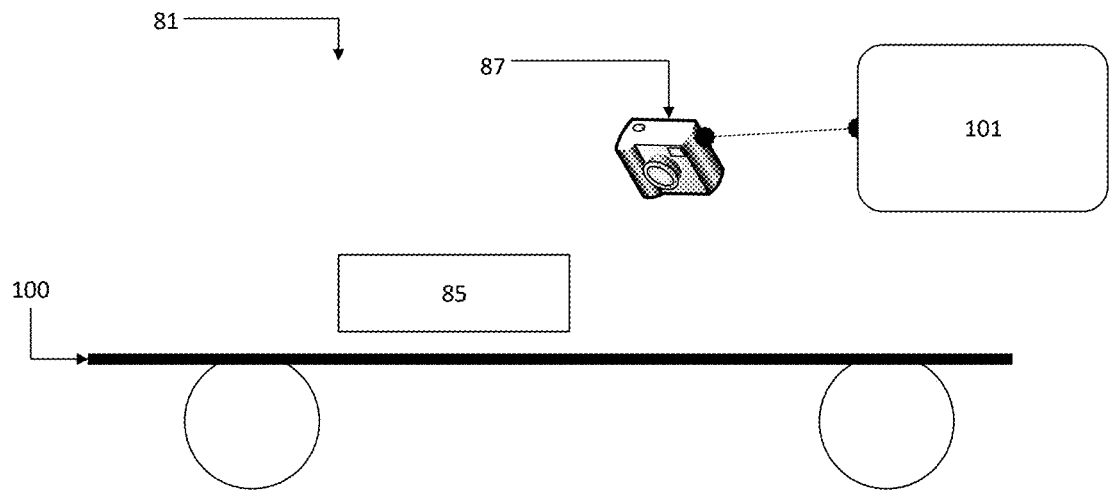
FIG. 8 is a schematic view of a thermography vision system of an embodiment.

Turning now to FIG. 8, there is shown a thermography vision system 81 according to one embodiment. Film 100 is transported to sealing mechanism 85 to seal the film 100 to itself or to another article. In one embodiment the sealing mechanism creates at least 10 seals per minute. In an embodiment, the sealing mechanism creates at least 50 seals per minute. In an embodiment, the sealing mechanism creates at least 100 seals per minute. In an embodiment, the sealing mechanism creates at least 250 seals per minute. In one embodiment, the sealing mechanism 85 is a heat generating seal mechanism such as a seal bar sealer, impulse seal, ultrasonic seal, or laser seal.

After sealing, the film 100 continues beyond the sealing mechanism 85 where a thermography image capture device 87 captures at least one image of the seal created by the sealing mechanism 85. The thermography image capture device is an infrared scanner or camera. In an embodiment, the infrared camera is capable of capturing at least two images of each seal as the film is in motion. In an embodiment, the infrared camera is capable of capturing at least four images of each seal as the film is in motion. In an embodiment, the infrared camera is capable of capturing images of each seal at a speed of at least 30 frames per second. In an embodiment, the infrared camera is capable of capturing images of each seal at a speed of at least 60 frames per second. In an embodiment the thermography image capture device 87 is positioned to capture an image of a seal between 2-40 seconds after the seal is created by the sealing mechanism 85 in the film 100. In an embodiment the thermography image capture device 87 is positioned to capture an image of a seal 5-30 seconds after the seal is created by the sealing mechanism 85 in the film 100. In an embodiment the thermography image capture device 87 is positioned to capture an image of a seal 10-20 seconds after the seal is created by the sealing mechanism 85 in the film 100. In an embodiment the thermography image capture device 87 is positioned to capture an image of a seal about two seconds after the seal is created by the sealing mechanism 85 in the film 100. In an embodiment the thermography image capture device 87 is positioned to capture an image of a seal about five seconds after the seal is created by the sealing mechanism 85 in the film 100. In an embodiment the thermography image capture device 87 is positioned to capture an image of a seal about 10 seconds after the seal is created by the sealing mechanism 85 in the film 100. In an embodiment the thermography image capture device 87 is positioned to capture an image of a seal about 20 seconds after the seal is created by the sealing mechanism 85 in the film 100. The residual heat from the sealing mechanism 85 allows for the thermography image capture device 87 to capture a thermal image of the seal along with variations in temperature along the seal area. Such variations may be indicative of a defective seal. The image data captured by the thermal image capture device 87 is sent to a vision inspection engine 101 as described in more detail herein.

Figure 9:
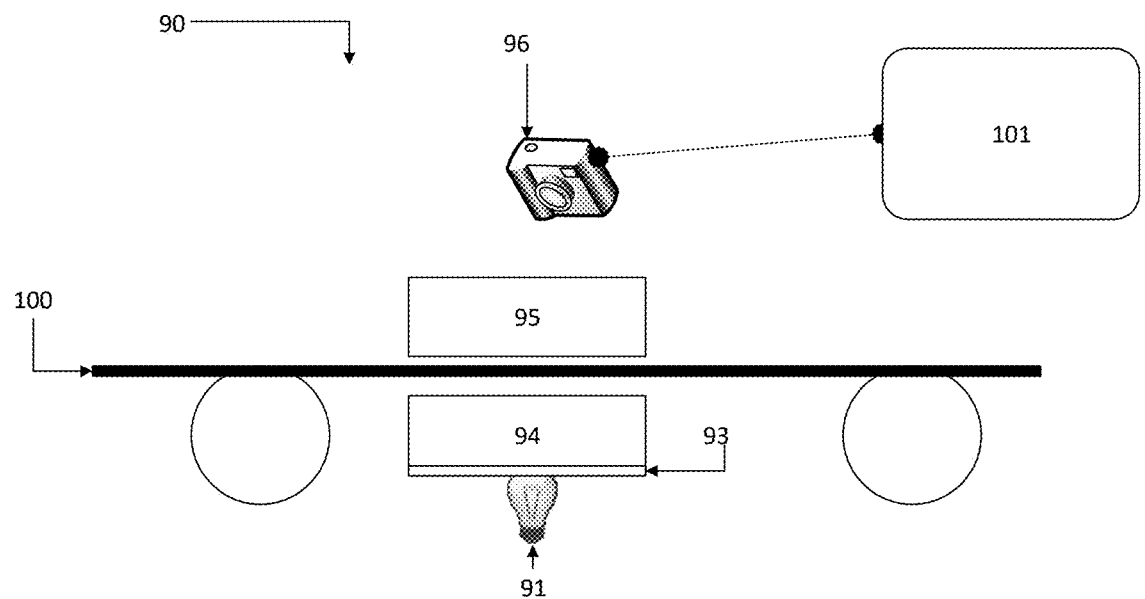
FIG. 9 is a schematic view of a photoelasticity vision system of an embodiment.

Referring now to FIG. 9 there is shown a photoelasticity vision system 91 according to one embodiment. Film 100 is transported to a position where the photoelasticity image capture device 96 and capture an image of light that passes through the seal area of film 100, linear polarizers 94 and 95. In an embodiment, the photoelasticity image capture device is an RGB camera capable of capturing images in the visible spectrum. The light from light source 91 passes through diffuse plate 93 to diffuse the light a first linear polarizer 94 having a direction of polarization oriented in a first direction to polarize the light from light source 91. It is understood that a diffused lights source can be utilized in lieu of, or in addition to use of a diffuse plate. The polarized light then passes through film 100 causing the light to rotate. The amount of rotation varies based on variables such as type of film, seal strength and seal integrity. With some of the light rotated, that light then passes through a second linear polarizer 95 having a direction of polarization oriented orthogonal to the first direction of the first linear polarizer 94. In the absence of film 100, no light would be transmitted from the light source 91 to the photoelasticity image capture device 96. However, since the film 100 rotates the light, photoelasticity image capture device 96 captures an image of the film 100.

In an embodiment, the light source 91 is a white light source having a wavelength spectrum from 400 nm-700 nm. In an embodiment the light source is a background light below the film. In another embodiment the light source is a polarized white light source, eliminating the need for the first linear polarizer.

While two linear polarizers are described above, it is contemplated that at least one of the linear polarizers is replaced by utilizing a polarizing filter film on the light source or the lens of the photoelasticity image capture device. In another embodiment, the photoelasticity image capture device includes a polarized lens to climate the need for the second linear polarizer. In another embodiment, the light source is a polarized light source. In an embodiment, the photoelasticity camera is capable of capturing at least two images of each seal as the film is in motion. In an embodiment, the photoelasticity camera is capable of capturing at least four images of each seal as the film is in motion. In an embodiment, the photoelasticity camera is capable of capturing images of each seal at a speed of at least 30 frames per second. In an embodiment, the photoelasticity camera is capable of capturing images of each seal at a speed of at least 60 frames per second.

The image data captured by the photoelasticity image capture device 97 is sent to a vision inspection engine 101 as described in more detail herein.

Figure 10:
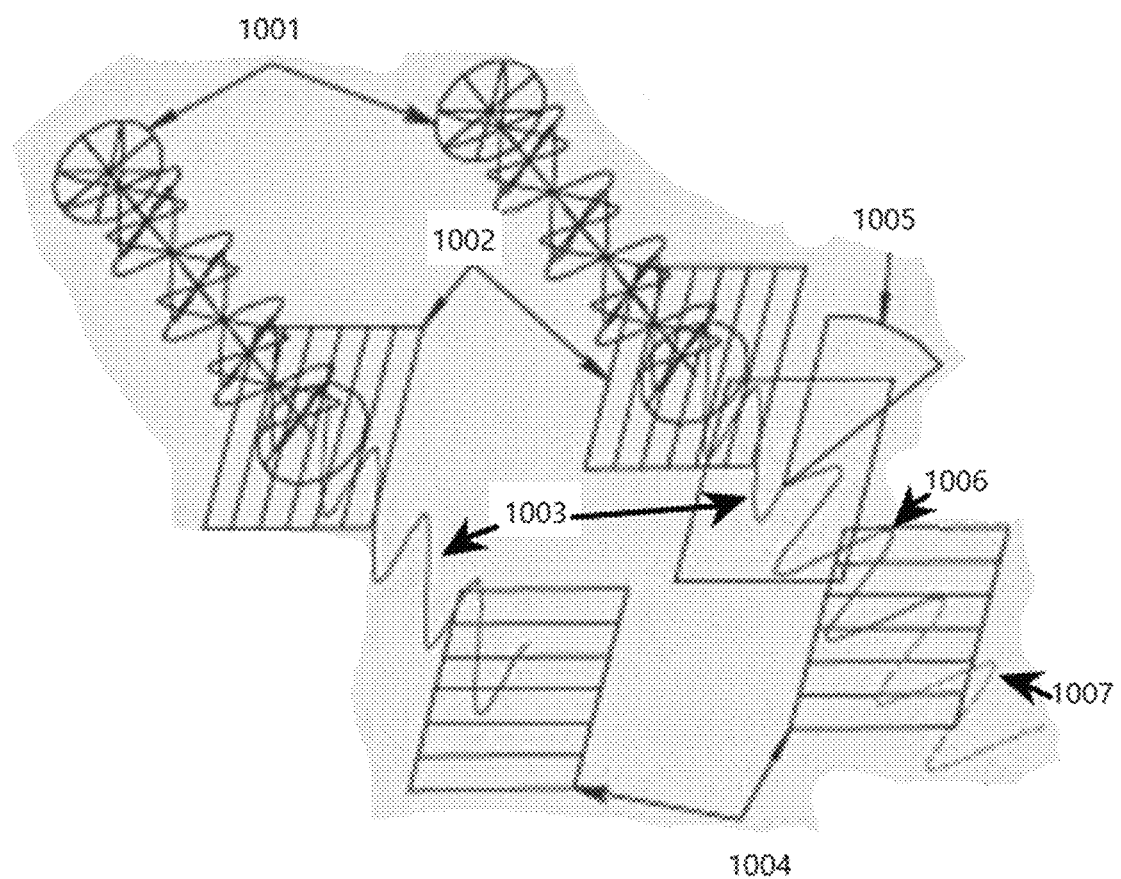
FIG. 10 is a schematic view of the principle of operation of a photoelasticity vision system according to an embodiment.

Referring now to FIG. 10 a schematic view the photoelasticity operation. The first polarizing filter 1002 has a direction of polarization orthogonal to that of the second polarizing filter 1004. Nonpolarized light 1001 passes through a first polarizing filter 1002 (i.e. linear polarizer) causing the nonpolarized light 1001 to become polarized light 1003. Absent film 1005, the polarized light 1003 is filtered by the second polarizing filter 1004 and no, or little, light passes through the second polarizing filter 1004. By contrast, when polarized light 103 passes through film 1005 the polarized light 1003 is rotated causing shifted polarized light 1006. This rotation allows some light to pass through second polarizing filter 1004. Variables that change the amount of rotation or filtering of the light include the thickness of the film, stress of the film, strain of the film. The varying amount of rotation allows for the capture of an image as described above.

Figure 11:
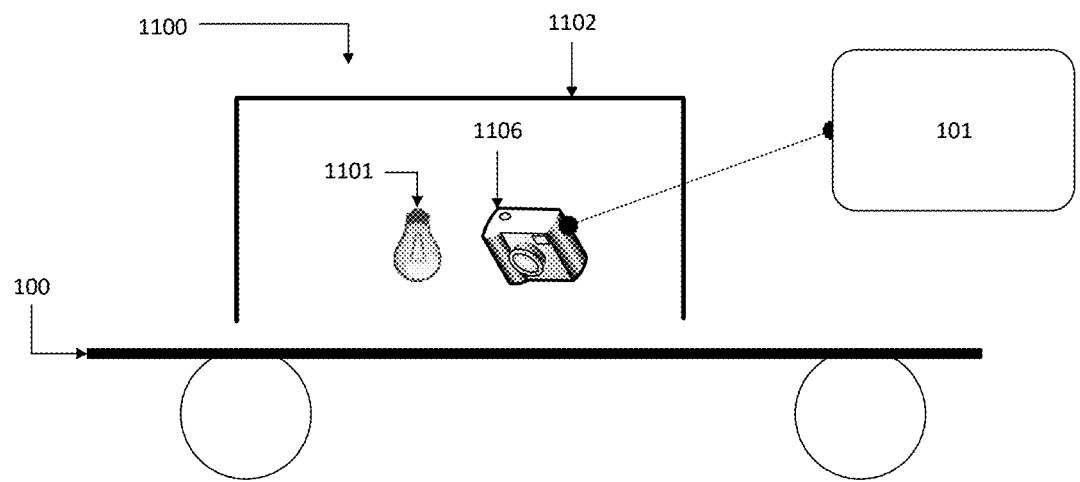
FIG. 11 is a schematic view of an ultraviolet vision system of an embodiment.

Referring now to FIG. 11, there is shown a ultraviolet vision system 1100 according to one embodiment. Film 100 is transported into a darkened enclosure 1102. An ultraviolet light source 1101 illuminates film 100 causing a detectable component in the film to excite and emit fluorescent electromagnetic energy. Ultraviolet image capture device 1106 captures at least one image of the seal area of film 100. In an embodiment, a blue pass filter is used to filter out wavelengths of light below 450 nm and about 525 nm. The blue pass filter improves use in higher than normal ambient lighting conditions. In one embodiment, either the light source or the blue pass filter transmits light of between 425-495 nm.

In an embodiment, the ultraviolet camera is capable of capturing at least two images of each seal as the film is in motion. In an embodiment, the ultraviolet camera is capable of capturing at least four images of each seal as the film is in motion. In an embodiment, the ultraviolet camera is capable of capturing images of each seal at a speed of at least 30 frames per second. In an embodiment, the ultraviolet camera is capable of capturing images of each seal at a speed of at least 60 frames per second. The properties of the seal allow for the ultraviolet image capture device 1106 to capture an ultraviolet image of the seal along with variations in emitted energy along the seal area. Such variations may be indicative of a defective seal. The image data captured by the ultraviolet image capture device 101 is sent to a vision inspection engine 101 as described in more detail herein.

Example System Architecture

Figure 12:
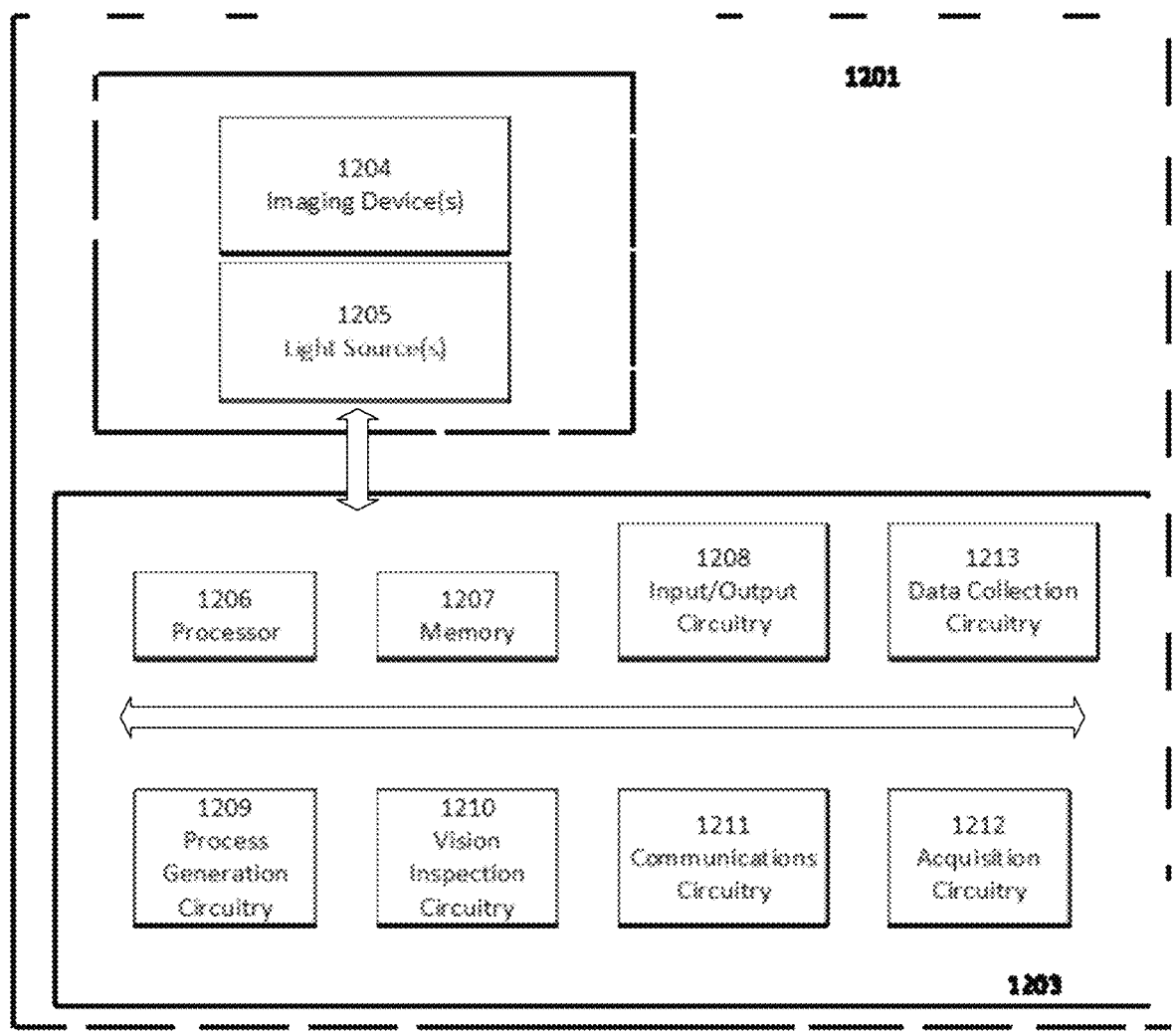
FIG. 12 is a block diagram of a vision system in accordance with an embodiment.

As illustrated in FIG. 12, in some embodiments, one or more computing systems, such as a computing apparatus, may be used control the imaging device(s) 1204, light source(s) 1205, and vision system 1201. In some embodiments, one or more computing systems may control or direct other computing systems to control other functions within the packaging environment, such as in-line conveyor and materials handling devices.

The vision inspection engine 101 (such as shown in FIGS. 8, 9 and 11) may be a computing apparatus 1203 which may include a processor 1206, a memory 1207, input/output circuitry 1208, communications circuitry 1211, vision inspection circuitry 1210, and acquisition circuitry 1209, and may be configured to execute the functions described herein. In some embodiments, the processor 1206 (and/or co-processor or any other processing circuitry assisting or otherwise associated with the processor) may be in communication with the memory 1207 via a bus for passing information among components of the apparatus. In some embodiments, the computing apparatus 1203 may be a distributed system of computing components and/or a remotely located computing device. In some embodiments, the computing apparatus 1203 may be local or remote. The memory 1207 may be nontransitory and may include, for example, one or more volatile and/or non-volatile memories. In other words, for example, the memory may be an electronic storage device (e.g., a computer readable storage medium). The memory may be configured to store information, data, content, applications, instructions, or the like, for enabling the apparatus to carry out various functions in accordance with any example embodiment of the present invention.

The processor 1206 may be embodied in a number of different ways and may, for example include one or more processing devices configured to perform independently. Additionally or alternatively, the processor may include one or more processors configured in tandem via a bus to enable independent execution of instructions, pipelining, and/or multithreading.

In an example embodiment, the processor 1206 may be configured to execute instructions stored in the memory 1207 or otherwise accessible to the processor. Additionally or alternatively, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the vision system 1201 may include input/output circuitry 1208 that may, in turn, be in communication with processor 1206 to provide output to the user and, in some embodiments, to receive an indication of a user input. The input/output circuitry 1208 may comprise a user interface and may include a display and may comprise a web user interface, a mobile application, a client device, a kiosk, or the like. In some embodiments, the input/output circuitry 1208 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 1207, and/or the like).

Meanwhile, the communications circuitry 1211 may be any means such as a device or circuitry embodied in either hardware or a combination of hardware and software that is configured to receive and/or transmit data from/to a network and/or any other device or module in communication with the computing apparatus 1203. In this regard, the communication circuitry may include, for example, one or more cables (e.g., USB cable) connecting the imaging device (s) 1204 and light source(s) 1205 to the vision system 1201 for use with the software and hardware configurations described herein. In some embodiments, the communications circuitry 1211 may include, for example, an antenna (or multiple antennas) and supporting hardware and/or software for enabling communications with a wireless communication network or one or more wireless devices. Additionally or alternatively, the communication interface may include the circuitry for interacting with the cable(s) and/or antenna(s) to cause transmission of signals via the cable(s) and/or antenna(s) or to handle receipt of signals received via the cable(s) and/or antenna(s). In some environments, the communication interface may additionally or alternatively support wired communication with a network (e.g., Ethernet). As such, for example, the communication interface may include a communication modem and/or other hardware/software for supporting communication via cable, digital subscriber line (DSL), universal serial bus (USB), or other mechanisms.

The acquisition circuitry 1212 may be used to buffer the series of images and data captured at the imaging device(s) 1204 (e.g., camera(s)). In some embodiments, the imaging device(s) 1204 may capture raw data incident on one or more surfaces within the imaging device (e.g., on one or more substrates of an image sensor). The imaging device(s) 1204 may convert the raw data into computer-readable image data via one or more circuitries, and may transmit the image data to the acquisition circuitry 1212. In some embodiments, image data may include any sensor data corresponding to a wavelength and/or intensity of electromagnetic energy used to detect defects in a packaged product. Image data may include individual images; sequences of images; videos; and the like. The acquisition circuitry 1212 may further control the imaging device(s) 1204 and light source(s) 1205 to trigger and time the respective illumination of the packaged product and capture of the raw data according to any embodiments of the present invention. In some embodiments, the image data may be captured through any of the means for generating image data disclosed herein, which includes, but is not limited to, any of the imaging devices (e.g., cameras, sensors, etc.) disclosed herein in both manual, autonomous, and partly-manual and partly-autonomous forms of operation.

The vision inspection circuitry 1210 may be used to facilitate processing and analysis the image data received from the acquisition circuitry 1212. The vision inspection circuitry 1210 may further trigger an alert or other downstream notifications or actions based on the result of the processing and analysis. The vision inspection circuitry may further connect to one or more remote servers for data mining and storage (e.g., to access models and data from which to train new models). In some embodiments, the vision system 1201 and vision inspection circuitry 1210 may comprise a single computing apparatus or may comprise multiple apparatus connected locally or interacting over a wired and/or wireless network.

In some embodiments, the vision system 1201 may include an operator user interface (e.g., as part of input/output circuitry 1208. Defect data (e.g., from the vision inspection circuitry 1210) may be displayed on the interface and archived either locally or remotely (e.g., via a local connection or networked connection) in a database. Defect data and images may be displayed real time on the interface. Instantaneous, historical, and statistical data may also be viewed on demand on the interface in some embodiments. The computing apparatus 1203 can be setup to selectively detect and accurately classify defects in the packaged product, including detection of the excited fluorescence-based indicator indicative of gas trapped within the packaging article.

Images of each defect can be classified, stored, displayed, and compared with prior and future images of other defects. The computing apparatus 1203 may capture high-resolution images of each defect in real time. Discrete defect information such as individual defect geometric information and statistics of group defects can be provided for instantaneous decision making and actions regarding process improvement and monitoring such as defect alarming. In some embodiments, each potential defect may be shown to an operator for a manual decision for how to handle the defective packaged product. In some embodiments, the screening, flagging, and/or separation of defective packaged products may be done partly or wholly automatically. Human operators may, in some instances, verify the work of an otherwise automatic system.

Various outputs for marking/flagging, alarming, and autonomy can be set for different defect severity levels. Data can be exported, for example, to MS Excel and/or a SQL database located anywhere on a network, with data mining software allowing various reports to be easily generated automatically and/or on-demand. Defect data may be processed on a processing unit such as a digital processing board. Flagging can be used in conjunction with separating and/or discarding packaged products with damaged film or film with damage above a predetermined threshold. Flagging can be carried by applying a label to the film at (or corresponding with) the location of the defect in the film for manual or automatic separation (e.g., with a robotic package separator). In some embodiments, defective packages (e.g., packaged products showing a leak or low-vac condition) may be unpackaged and repackaged with a new packaging article.

In an embodiment, the input/output circuitry 1208 may allow for external signal inputs such as new roll or new production run indication and pause inspection indication. Outputs for alarms on user-defined defect alarm criteria are also handled through the input/output circuitry 1208 (e.g., the user interface). Outputs can also be initiated to control downstream flagging or marking devices. Alarms can be activated for defects of different pre-defined seventies or criteria. Alarm and defect information from the computing apparatus 1203 can be sent via OPC (i.e., software interface standard) to the plant network, programmable logic controller (PLC), or supervisory control and data acquisition/human machine interface (SCADA/HMI).

In an embodiment, an encoder (not shown) may be used to measure conveyor speed so that the location of a detected defective packaged product is ascertainable. A series of pulses from the encoder is received by the system and counted. The count is sent to the processor 1206 to determine the distance down the conveyor at which the detected defective packaged product is located, and may be used to time operation of a defect separator to remove the defective packaged product from the line prior to pack off (when the packaged product moves off of the production line).

While a local system is depicted, it is understood that a distributed system may be utilized by connecting a plurality of computing apparatus via a network. In some embodiments, the network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, network may include a cellular telephone, an 802.11, 802.16, 802.20, and/or WiMax network. Further, the network may include a public network, such as the Internet, a private network, such as an intranet, or combinations thereof, and may utilize a variety of networking protocols now available or later developed including, but not limited to TCP/IP based networking protocols.

In some embodiments, the plurality of computing apparatuses may collectively include the features of the computing apparatus 1203 described above with respect FIG. 4. In some embodiments, any number of computing apparatuses may make up the computing apparatus.

Example Detection Models and Algorithms

Figure 13:
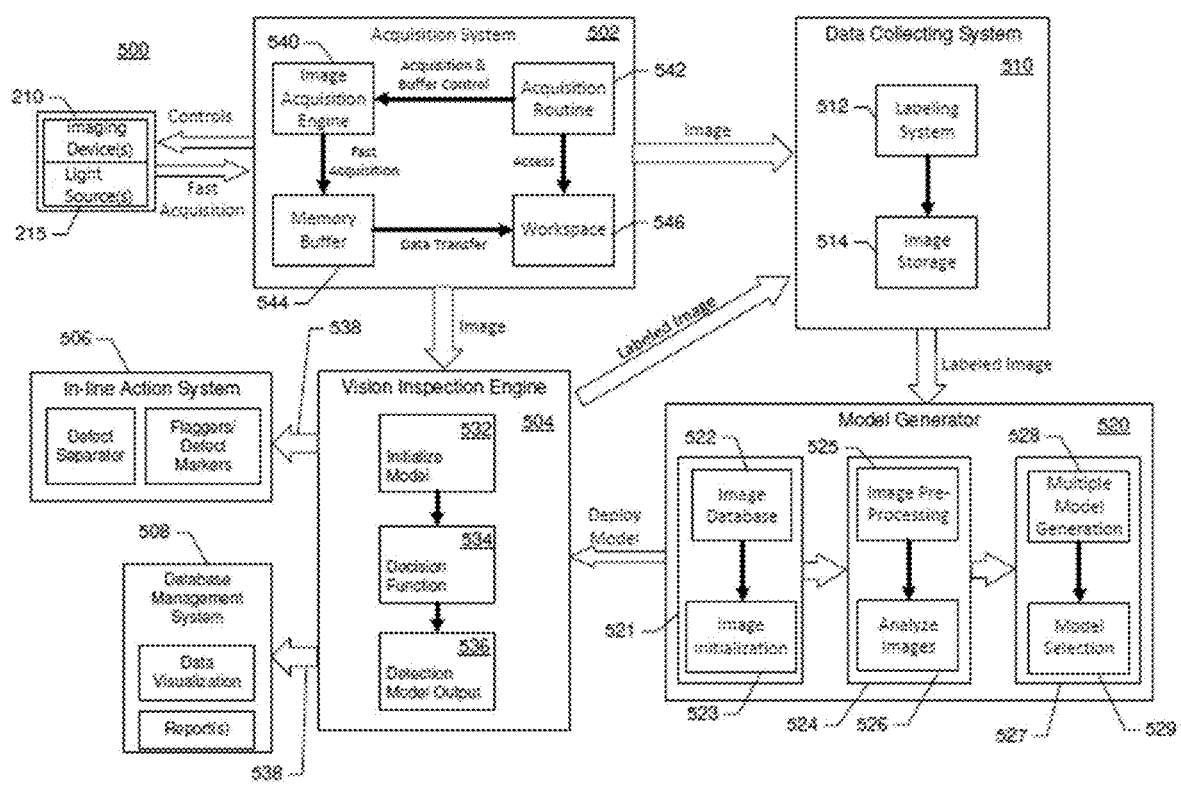
FIG. 13 is a block diagram of a system for assessing the integrity of a seal in accordance with an embodiment.
Figure 14:
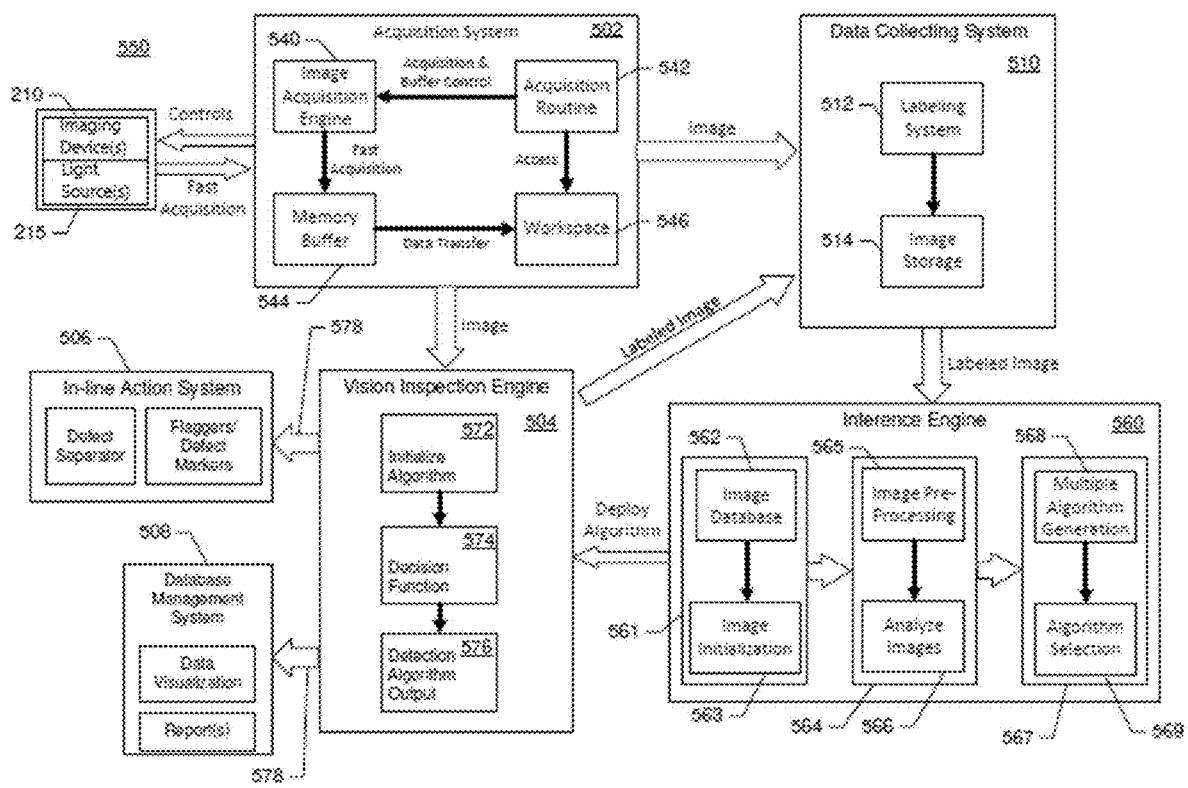
FIG. 14 is a block diagram of a system for assessing the integrity of a seal in accordance with an embodiment.

In some embodiments, various algorithms, models, and processes may be implemented to detect defects in the seal of product packaging and packaged product. Each of the algorithms, models, and processes may be configured to locate and identify seal defects. In some embodiments, an artificial intelligent algorithm may be implemented (e.g., as shown in FIG. 13), while in other embodiments, an algorithmic approach may be used based on received sensor information (e.g., as shown in FIG. 14). The processes disclosed herein (e.g., algorithmic solutions, model-based solutions, etc.) may receive image data in one or more states of processing and pre-processing; may further process, sort, classify, and analyze the image data; and may identify seal defects present in the packaging article based thereon.

FIG. 13 illustrates a flow diagram of a model-based process 500 (depicted as a functional block diagram) for assessing whether a seal of a packaging article has a defect. The process 500 may be embodied in and executed by, for example, the vision systems shown in FIGS. 8, 9 and 11 herein. As depicted, the system may include one or more imaging devices 210, a data acquisition system 502 (e.g., utilizing the computing apparatus 1203 and acquisition circuitry 1212 shown in FIG. 12), a vision inspection engine 504 (e.g., utilizing the computing apparatus 1203 shown in FIG. 12 and vision inspection circuitry 1210 shown in FIG. 12), an in-line action system 506, a database management system 508, a data collecting system 510 (e.g., utilizing the computing apparatus 1203 shown in FIG. 12 and data collection circuitry 1213), and a model generator 520 (e.g., utilizing the computing apparatus 1203 shown in FIG. 12 and process generation circuitry 1209 shown in FIG. 12).

FIG. 13 shows an example flow diagram for executing a process 500 described according to some embodiments.

In the depicted embodiment, using an appropriate combination of an imaging device (e.g., including lens and/or sensor choice) and lighting (e.g., via light source(s) 215), a series of images are acquired and fed into the acquisition system 502 where the data is acquired, buffered, and transferred to one of the vision inspection engine 504 or data collecting system 510. The depicted embodiment of FIG. 13 includes two example use cases, a model generation workflow and a model application workflow.

In a model generation workflow, the process 500 may generate a model from a plurality of images. Images may be captured by the imaging device(s) 210 and received by the acquisition system 502. The acquisition system may include an image acquisition engine 540, acquisition routine 542, memory buffer 544, and workspace 546. The acquisition system 502 may buffer the image and transmit the image to the data collecting system 510, which may label 512 the images (e.g., good/sufficient seal or bad/weak seal) and store the images 514. In some embodiments, the model generation workflow may retrieve images directly from storage 514 or the images (e.g., a training set) may be loaded into the system separately (e.g., via communications circuitry 1211 shown in FIG. 12).

The images may be labeled 512 using any process described herein. For example, a user may input a label into the system in association with each image. In some embodiments, the packaging article may include a tag or label that identifies the characteristics of the packaging article to the user or to a vision system for association with the respective images to the packaging article.

From the data collecting system 510, the labeled images may be input to the model generator 520 to generate one or more models, which may receive the images in a first step 521 by receiving the labeled images in an image database 522 and initializing the images 523 for use in the model generator. The initialized images may then be passed into image analysis 524 where the images may be pre-processed 525 and may be analyzed 526. The model generation 527 may then be performed to create multiple models 528 based on the analyzed images using the training process described herein, and the models may be tested and a preferred model selected 529 in some embodiments based on the model evaluation matrix (which includes parameters such as accuracy, false positives, true positives, recall, precision, and others) of its predictions in the test data.

Once the model is created and selected in the model generator 520, the model may be deployed to the vision inspection engine 504 in a model application workflow. In the model application workflow, an image may be captured by the imaging device(s) 210 and fed into the acquisition system 502 where the data is acquired, buffered, and transferred to the vision inspection engine 504. In the vision inspection engine 504, the model may be applied to an unknown image to classify the image (e.g., good/sufficient seal or bad/weak seal) based on the artificial intelligent algorithm developed by the model generator 520 in the model generation workflow. The process may include initializing the model 532, the image may be input into the decision function 534 to receive a decision at the detection model output 536.

The detection results 538 may be fed into the in-line action system 506 to set up predetermined alarms, film flagging, displaying an image of a faulty seal (e.g., via the user interface), displaying data pertaining to one or more defects including displaying data related to geometric characteristics of the faulty seal area, location of the defect, degree of occurrence of defects; severity of defects, generating a report of defect data and/or any other desired output. Data pertaining to defects can be displayed instantaneously and online, or after production is complete (i.e., offline or not-on-the-fly), the data being accessible in an offline database management system 508. Using data mining, the data can be manipulated, visualized, and organized into any on-demand report forms desired.

The detection results may further be transferred from the vision inspection engine 504 to the data collecting system 510 as labeled images to be stored in image storage 514 and used in subsequent model generation processes to recursively reduce loss of the objective function and improve the models' performance based on model evaluation matrix.

The data processing software and hardware may be set up to accommodate different seal types with minimum need for on-the-fly adjustment of parameters such as exposure time and light intensity. In some embodiments, portions of the process 500 may be done offline or remotely. For example, the data collecting system 510 and/or model generator 520 may be remotely located from the remainder of the process (e.g., performed on a server). Moreover, some of or all of the vision inspection process may occur remotely.

Turning to FIG. 14, an example flow diagram of an algorithmic process 550 is shown (depicted as a functional block diagram) for assessing whether a packaging article has a faulty seal. The process 550 may be embodied in and executed by, for example, the vision systems shown in FIGS. 8, 9 and 11 herein. As depicted, the system may include one or more imaging devices 210, a data acquisition system 502 (e.g., utilizing the computing apparatus 1203 and acquisition circuitry 1212 shown in FIG. 12), a vision inspection engine 504 (e.g., utilizing the computing apparatus 1203 shown in FIG. 12 and vision inspection circuitry 1210 shown in FIG. 12), an in-line action system 506, a database management system 508, a data collecting system 510 (e.g., utilizing the computing apparatus 1203 shown in FIG. 12 and data collection circuitry 1213), and an inference engine 560 (e.g., utilizing the computing apparatus 1203 shown in FIG. 12 and process generation circuitry 1209 shown in FIG. 12). FIG. 14 shows an example flow diagram for executing a process 550 described according to some embodiments.

In the depicted embodiment, using an appropriate combination of an imaging device(s) 210 (e.g., including lens and/or sensor choice) and light source(s) 215 (e.g., via illuminators, UV lighting, polarized light), a series of images are acquired and fed into the acquisition system 502 where the data is acquired, buffered, and transferred to one of the vision inspection engine 504 or data collecting system 510. The depicted embodiment of FIG. 14 includes two example use cases, an algorithm generation workflow and an algorithm application workflow.

In an algorithm generation workflow, the process 550 may generate an algorithm from a plurality of images. Images may be captured by the imaging device(s) 210 and received by the acquisition system 502. The acquisition system may include an image acquisition engine 540, acquisition routine 542, memory buffer 544, and workspace 546. The acquisition system 502 may buffer the image and transmit the image to the data collecting system 510, which may label 512 the images (e.g., good/sufficient seal or bad/weak seal) and store the images 514. In some embodiments, the algorithm generation workflow may retrieve images directly from storage 514 or the images (e.g., a test set of images) may be loaded into the system separately (e.g., via communications circuitry 1211 shown in FIG. 12).

The images may be labeled 512 using any process described herein. For example, a user may input a label into the system in association with each image. In some embodiments, the packaged product may include a tag or label that identifies the characteristics of the packaged product to the user or to a vision system for association with the respective images of the product. In some embodiments, a training set may be pre-loaded with labels.

From the data collecting system 510, the labeled images may be input to the inference engine 560 to generate and identify one or more algorithms that may receive the images in a first step 561 by receiving the labeled images in an image database 562 and initializing the images 563 for use in the inference engine. The initialized images may then be passed into image analysis 564 where the images may be pre-processed 565 and may be analyzed 566. The algorithm determination 567 may then be performed to create one or more algorithms 568 based on the analyzed images using the process described herein, and the algorithms may be tested and a preferred algorithm selected 569 in some embodiments based on the model evaluation matrix of its predictions in the test data. In some embodiments, one hundred test images are used. In some embodiments, one thousand test images are used. In some embodiments, a user may manually identify desired features in the images and/or image processing parameters to identify the features during or before algorithm generation. In some embodiments, the system may partly or fully autonomously process the images and/or detect desired features in the image using the techniques described herein.

Once the algorithm is created and selected in the inference engine 560, the algorithm may be deployed to the vision inspection engine 504 in an algorithm application workflow. In the algorithm application workflow, an image may be captured by the imaging device(s) 210 and fed into the acquisition system 502 where the data is acquired, buffered, and transferred to the vision inspection engine 504. In the vision inspection engine 504, the algorithm may be applied to the unknown (e.g., unlabeled) image to classify the image (e.g., good/sufficient seal or bad/weak seal) based on the algorithm selected in the inference engine 560 in the algorithm generation workflow. The process may include initializing the algorithm 572, the image may be input into the decision function 574 to receive a decision at the detection algorithm output 576.

The detection results 578 may be fed into the in-line action system 506 to set up predetermined alarms, film flagging, displaying an image the seal area (e.g., via the user interface), displaying data pertaining to one or more defects including displaying data related to geometric characteristics of the seal, location of the defect, degree of occurrence of defects; severity of defects, generating a report of defect data and/or any other desired output. Data pertaining to defects can be displayed instantaneously and online, or after production is complete (i.e., offline or not-on-the-fly), the data being accessible in an offline database management system 508. Using data mining, the data can be manipulated, visualized, and organized into any on-demand report forms desired.

The detection results may further be transferred from the vision inspection engine 504 to the data collecting system 510 as labeled images to be stored in image storage 514 and used in subsequent algorithm generation processes to improve the algorithms' evaluation matrix. In some embodiments, the image analysis and algorithm generation in the inference engine 560 may be performed autonomously. In some embodiments, the image analysis and algorithm generation in the inference engine 560 may be performed partly manually. In some embodiments, the image analysis and algorithm generation in the inference engine 560 may be performed manually.

The data processing software and hardware may be set up to accommodate different concentration levels with minimum need for on-the-fly adjustment of parameters such as exposure time and light intensity. In some embodiments, portions of the process 550 may be done offline or remotely. For example, the data collecting system 510 and/or inference engine 560 may be remotely located from the remainder of the process (e.g., performed on a server). Moreover, some or all of the vision inspection process may occur remotely.

In some example embodiments, an algorithmic process may be used to detect seal quality of the packaging article. For example, in some embodiments, a feature-extraction based algorithm may be used to detect portions of the seal in the packaging article exhibiting excited fluorescence above a predetermined threshold intensity or at a predetermined wavelength or change in wavelength from incident light. In some embodiments, a feature-extraction based algorithm may be used to detect portions of the seal in the packaging article exhibiting thermal gradients distinct from baseline thermal gradients. In some embodiments, dark feature detection may be used to identify dark spots and light spots in the captured image data, which may separate areas of low fluorescence from areas of high fluorescence, with the high fluorescence areas indicating a likelihood of a faulty seal. In some embodiments, light feature detection may be used in a similar manner to dark feature detection. In some embodiments, dark feature detection and light feature detection may be calculated based on grey scale value thresholds of the image data. In some embodiments, feature extraction may include extracting one or more textures of the image. The image textures may be compared to reference images to identify a faulty seal. In some embodiments, feature extraction may further be used to exclude undesired areas such as background or an area around the seal. For example, in some embodiments, the seal of the packaging article may have an inconsistent texture or thickness, which may produce a false positive on the captured images. In some embodiments, the bright spot caused by the seal may be excluded from the algorithm.

In some embodiments, the algorithmic process may comprise streak detection. The streak detection may be based on extracted geometry features in the captured images.

Figure 15:
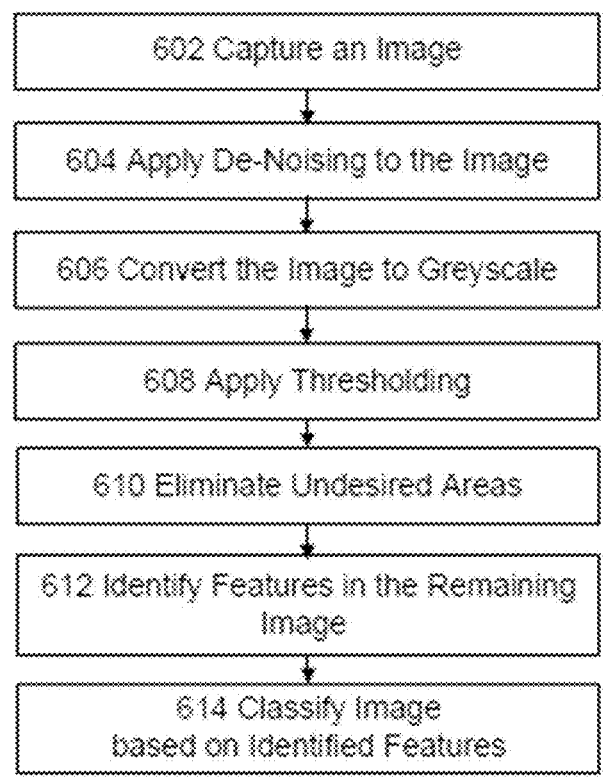
FIG. 15 is a flow sheet of an algorithm in accordance with an embodiment.

With reference to FIG. 15, in an example embodiment, the algorithm 600 (e.g., an algorithm generated by the inference engine 560) and associated image processing may comprise the following steps: (1) capture an image 602; (2) apply de-noising to the image 604; (3) convert the image to greyscale 606; (4) apply thresholding to reduce the section of the image for consideration 608; (5) in some embodiments, eliminate undesired areas of the image 610; and (6) identify features in the remaining image corresponding to a faulty seal 612. In some embodiments, the algorithm 600 may further include classifying an image based on the detected features 614. In some embodiments, steps of the aforementioned algorithm may be eliminated so long as the faulty seal can be identified.

Figure 16:
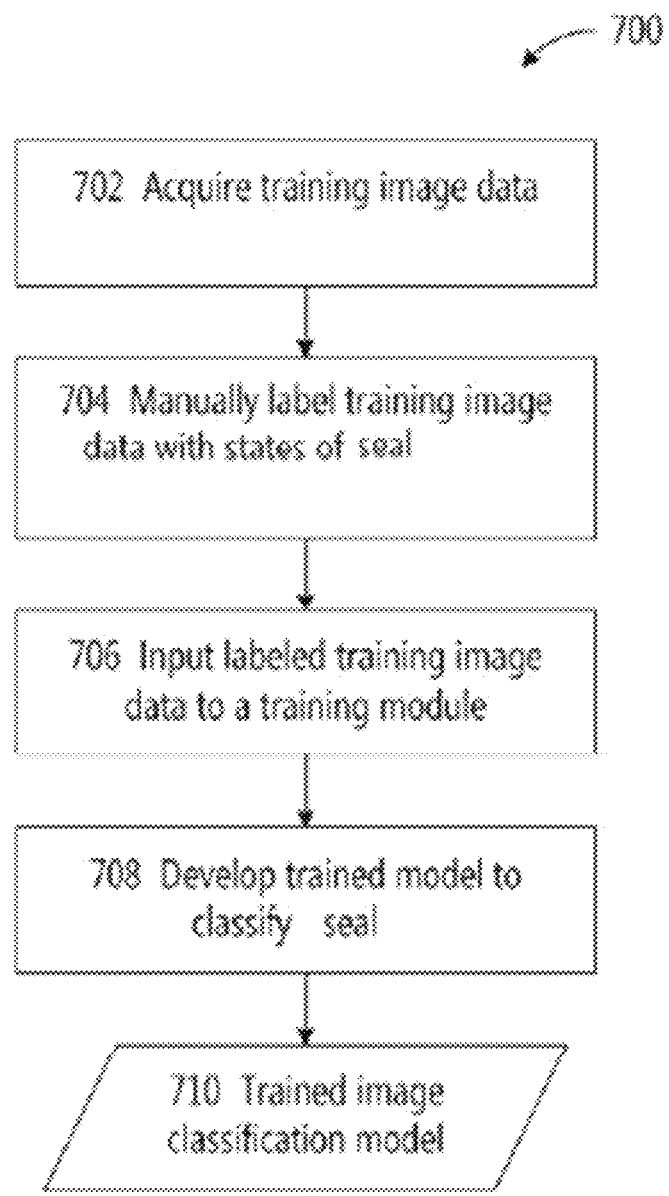
FIG. 16 is a flow sheet of a method of developing a trained image classification model in accordance with an embodiment.

As noted above, in some embodiments, an artificial intelligent algorithm (e.g., detection model shown in FIG. 13) may be developed to classify image data of the seal (e.g., trained using the model generator 520 shown in FIG. 13). Depicted in FIG. 16 is an embodiment of a method 700 of developing a trained image classification model. At block 702, training image data of seal areas is obtained. In some embodiments, the training image data includes images and/or video (i.e., a sequence of images) of seals having a known state. In some embodiments, the vision system used to obtain the training image data is the same as the vision system that will be used to obtain image data of seal area of the packaging article of an unknown state after the trained image classification model is created (e.g., the vision system in the final production line). In some embodiments, a test bed or other experimental configuration may be used to obtain the training image data. At block 704, the training image data is manually labeled with the states of the seal area of the packaging article in the training image data. For example, a user can manually input a state (e.g., the packaging article has a defective seal, has an adequate seal, or has a particular defect) for each image and/or video of a seal in the image data. Manually labeling the image data may include physically testing the seals to determine whether individual seals are adequate or defective and then applying a label to the image data based on the results of the physical testing. The training samples may include a plurality of seals and a plurality of defective seals. In some embodiments, the number of seals represented in the training image data is in a range of tens of seals, hundreds of seals, thousands of seals, or more. At these numbers, the manual labeling process of the training image data may be a labor- and time-intensive process. At block 706, the labeled training image date is input into a training module.

In some embodiments, the training model is a machine learning module, such as a "deep learning" module. Deep learning is a subset of machine learning that generates models based on training data sets provided to it. In some embodiments, the training model may use supervised learning techniques, semi-supervised learning techniques unsupervised learning techniques including clustering, anomaly detection, Hebbian Learning, as well as learning latent variable models such as Expectation-maximization algorithm, method of moments (mean, covariance), and Blind signal separation techniques, which include principal component analysis, independent component analysis, non-negative matrix factorization, and singular value decomposition. In one example, unsupervised learning techniques were utilized in combination with several image pre-/post-processing techniques including imaging texture analysis (e.g., calculating Leaker Detection Index values) to achieve detection and classification. In another embodiment, the unsupervised learning technique Anomaly Detection was utilized in combination with several image pre-/post-processing techniques including imaging texture analysis to achieve detection and classification.

In embodiments, unsupervised learning techniques include the following steps. 1) Data Collection where images are collected for all types of seals without any category definition. Best practices are implemented to ensure only baseline seals are produced. 2) Algorithm Development where autoencoder components like encoder, decoder and latent space vector are design based on the input data specification and expected output. 3) Algorithm Training where the autoencoder neural network is trained on the baseline seals dataset with object to reproduce the samples with finest details. 4) Defect Segregation where post training the autoencoder is deployed into production. The input seals that produce error divergent from the baseline examples are segregated. 5) Algorithm Re-Training where segregated defects are validated by a human. A set of false positive samples is prepared and used to retrain the autoencoder to further improve the accuracy. The process may be repeated to improve performance.

In embodiments, semi-supervised learning techniques include the following steps. 1) Segregate defective seals from baseline using autoencoders. 2) Clustering defective seals by grouping defective seals based on a similarity score using clustering algorithm. 3) Manual categorization by a human evaluating defective seal cluster and assignment of categories. 4) Automatic categorization which requires developing a classification algorithm based on the manually categorized defects.

At block 708, the artificial intelligent algorithm is developed to classify seals. In some embodiments, as the artificial intelligent algorithm is developed, one or more learning algorithms are used to create the artificial intelligent algorithm based on the labeled states of the seals in the training image data. In some embodiments, the artificial intelligent algorithm is created based on one or more input vectors which are indicative of a characteristic of the seal. In one example, the input vector may be pleats in the seal. In another example, the input vectors may be the properties of the fluorescent electromagnetic energy emitted by excited fluorescence-based indicator in the film in accordance with the particular indicator and illumination used, as described above. For example, the input vectors may include one or more of a wavelength of the fluorescent electromagnetic energy emitted by an excited fluorescence based indicator; an intensity of the fluorescent electromagnetic energy emitted by the excited fluorescence-based indicator; and/or a change in wavelength of the fluorescent electromagnetic energy emitted by the excited fluorescence-based indicator compared to the incident electromagnetic energy from the illuminators. In some embodiment, the input vectors may correspond to a wavelength of the fluorescent electromagnetic energy emitted by the excited fluorescence-based indicator being one or more colors in the visible spectrum, detection of an additive in a film of the packaging article using a non-visible electromagnetic energy (e.g., ultraviolet, infrared), thermal imaging scans, visible light scans, photoelasticity scans, the presence and numbers of film folds, or any other number of possible input vectors. In an embodiment the light source(s) 215 can be an ultraviolet backlight with software for controlling shutter speed and light intensity. In other embodiments, the light source(s) 215 are white light. In some embodiments, the wavelength of the fluorescent electromagnetic energy emitted by the excited fluorescence based indicator may be at least in the ultraviolet range. In some embodiments, the wavelength of the fluorescent electromagnetic energy emitted by the excited fluorescence based indicator may be at least in the visible spectrum. In some embodiments, the wavelength of the fluorescent electromagnetic energy emitted by the excited fluorescence based indicator may be at least in blue or violet range. In some embodiments, the wavelength of the incident light from the illuminators may be at least in the ultraviolet range. In some embodiments, the wavelength of the incident light from the illuminators may define a peak in the ultraviolet range. In some embodiments, the wavelength of the incident light may be in the ultraviolet range and the fluorescent electromagnetic energy emitted by the excited fluorescence-based indicator may be in the visible range. In embodiments in which the process is designed to simultaneously inspect multiple film layers at the same time for the same film, multiple light sources 215 and/or multiple imaging devices 210 can be used with one or more controls for shutter speed, light intensity, light source, backlighting or over lighting.

The use of input vectors for training may help the artificial intelligent algorithm identify defective seal without identifying the underlying cause. For example, a seal may have a small pleat that would be difficult to detect using image data captured as the packaging article is being moved on a transportation system. The use of the input vectors, fluorescence-based indicator, thermal image data, photoelasticity image data, detailed herein allows the artificial intelligent algorithm to detect that the seal is defective without the need to identify the defect itself. After the input vectors are modeled, an artificial intelligent algorithm can be developed as a decision-making process based on a number of the input vectors. Examples of decision-making processes include decision trees, neural networks, and the like. In some embodiments, the decision-making process of the artificial intelligent algorithm is based on a determination of an acceptable arrangement of the input vectors in the decision-making process.

Figure 20:
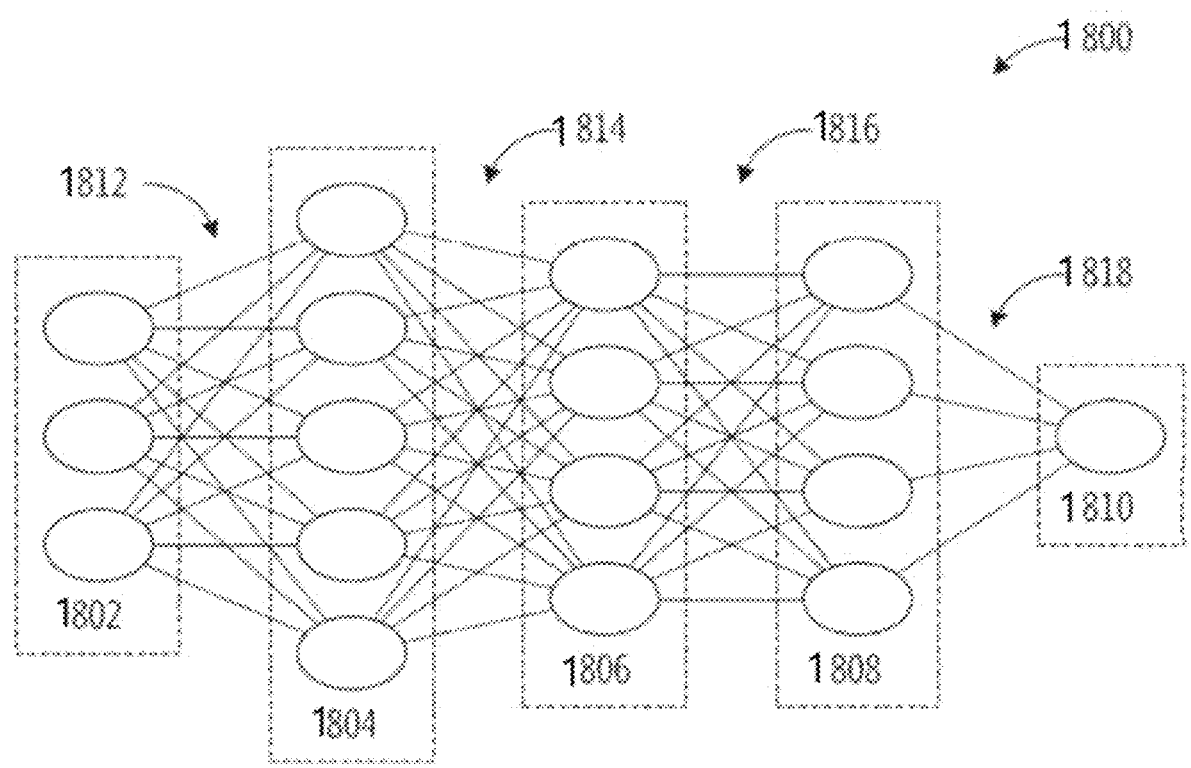
FIG. 20 is a schematic of a neural network that is a multilayer neural network in accordance with an embodiment.

The result of the development of the artificial intelligent algorithm in block 708 is the artificial intelligent algorithm depicted at block 710. The artificial intelligent algorithm can be used during normal operation (e.g., operation that is not used to train to the artificial intelligent algorithm) to identify states of seal. In some embodiments, the artificial intelligent algorithm includes a neural network that has a number of layers. Depicted in FIG. 20 is an example of a neural network 1800 that is a multilayer neural network. In the depicted embodiment, the neural network 1800 includes a first layer 1802 with three input nodes, a second layer 1804 with five hidden nodes, a third layer 1806 with four hidden nodes, a fourth layer 1808 with four hidden nodes, and a fifth layer 1810 with one output node.

The neural network 1800 also includes a first set of connections 1812 between each pair of the three input nodes in the first layer 1802 and the five input nodes in the second layer 1804, a second set of connections 1814 between each pair of the five input nodes in the second layer 1804 and the four hidden nodes in the third layer 1806, a third set of connections 1816 between each pair of the four hidden nodes in the third layer 1806 and the four hidden nodes in the fourth layer 1808, and a fourth set of connections 1818 between each pair of the four hidden nodes in fourth layer 808 and the output node in the fifth layer 1810. In some embodiments, the input nodes represent inputs into the artificial intelligent algorithm (e.g., image data, metadata associated with the image data, etc.), one or more of the hidden nodes (e.g., one of the layers of hidden nodes) may represent one of the input vectors determined during the development of the model, and the output node represents the determined state of the seal.

Figure 17:
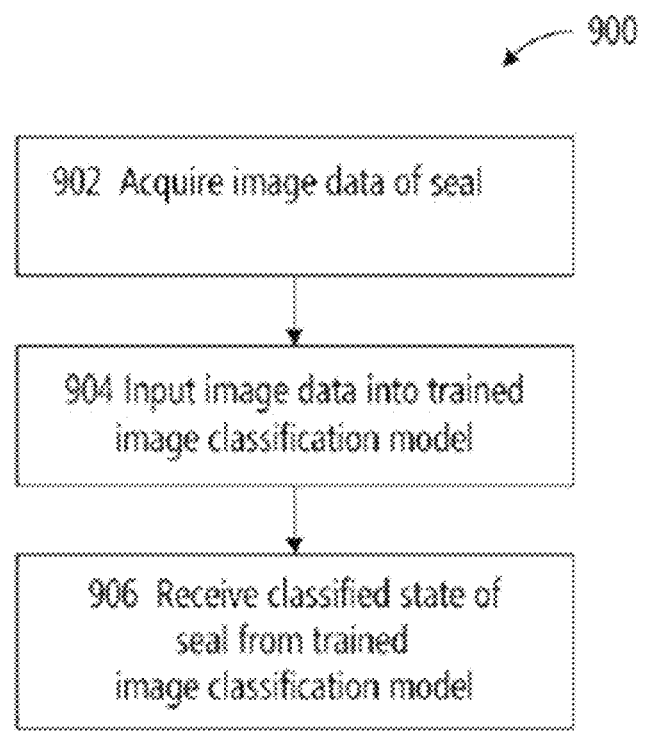
FIG. 17 is a flow sheet of a method of developing a trained image classification model based on a number of parameters in accordance with an embodiment.

Referring now to FIG. 17 is an embodiment of a method 900 of using a trained image classification model to classify a state (e.g., pleat, weak seal, cold seal, channel pleat) of a seal. At block 902, image data of the seal is acquired (e.g., by imaging device(s) 210). The image data of the seal may be obtained by a vision system. In some embodiments, the image data of the seal is obtained while the packaging article is being transported by a transport system. It is understood that the image data can be captured after forming seals in the formation of the packaging article, or after forming of seals to seal a product in the packaging article.

At block 904, the image data of the seal is input into a trained image classification model. The trained image classification model may be operating on a computing device or a remote computing device from the local computing device. The trained image classification model is configured to classify a state of the seal based on the image data. At block 906, a classification of a state of the seal is received from the trained image classification model. In some embodiments, the classified state includes an indication that the seal is defective, is non-defective, or has a particular defect, and/or an indication of a degree of certainty as to whether the seal is defective, is non-defective, or has a particular defect. In some embodiments, the classified state is received by one or more of displaying the classification on a user interface output device, communicating the classification via a communication interface to one or more external devices, or storing the classification in a database. In some embodiments, the received classification the seal includes one or more of the classified state or the seal or a degree of certainty of the classified state of the classified state of the seal. In one specific example, the state is communicated to a routing system (e.g., a pack-off apparatus) that is configured to route the packaging article on a transportation system based on their seal states, such as routing defective packages to a location for testing, repackaging, recycling and/or waste disposal.

As noted above, the method 700 is used to obtain the trained classification model at block 710 and then the trained classification model can be used in method 900 to classify seals. In some embodiments, the training image data acquired at block 702 is image data of a seal for a particular type of product packed in a packaging article and the image data acquired at block 902 is image data of the same type of seal for the particular type of product packed in a packaging article. In one example, the training image data acquired at block 702 is image data of the seal and the image data acquired at block 902 is image data of the same type of seal. In some embodiments, the training image data acquired at block 702 is image data of a particular type seal and the image data acquired at block 902 is image data of a different type of seal. Even though the seal imaged in-line may be a different type from the seal used in the training set, the trained classification model using the training image data from the training seal image data may be able to classify states of the seal with sufficient accuracy.

Figure 18:
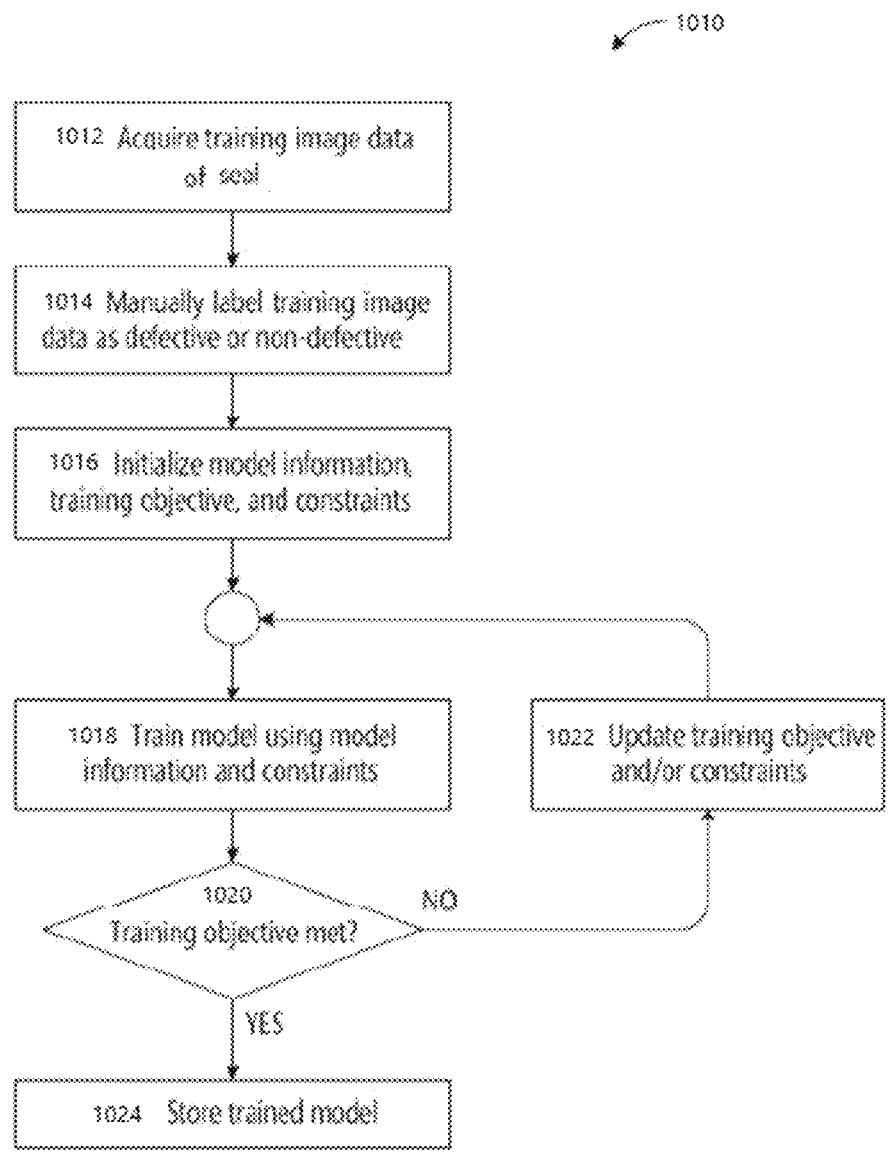
FIG. 18 is a flow sheet of a method of developing a trained image classification model based on a number of parameters in accordance with an embodiment.

Depicted in FIG. 18 is an embodiment of a method 1010 of developing a trained image classification model. At block 1012, training image data is acquired for a number of seals. At block 1014, the training image data is manually labeled as defective or non-defective. The manual labeling of the training image data may be done by a user entering an indication of defective or non-defective for each of the seals represented in the training image data into a user interface input device of a computing apparatus. In some embodiments, training packaging articles having seals may be labeled with their respective status (e.g., defective or non-defective). Training packaging articles are packaging articles with either known defective seals, or known non-defective seals. The training packaging articles may further identify particular defects. The training packaging articles are used to train the model to improves reliability of the model.

At block 1016, model information, training objectives, and constraints are initialized. In some examples, model information includes a type of model to be used, such as a neural network, a number of input vectors, and the like. In some examples, training objectives can include a desired or expected performance of the artificial intelligent algorithm, such as an evaluation matrix has a confidence rating of greater than or equal to a predetermined rate (e.g., greater than or equal to one or more of 90%, 95%, 96%, 97%, 98%, or 99%). In some examples, constraints can include limitations of the artificial intelligent algorithm, such as a minimum number of layers of a neural network, a maximum number of layers of a neural network, a minimum weighting of input vectors, a maximum weighting of input vectors, or any other constraints of an artificial intelligent algorithm. At block 1018, the model can be trained using the model information and the model constraints. In some embodiments, the training image data is separated into two subsets—a training subset and a validation subset—and the training of the model at block 1018 includes training the model using the training subset of the image data.

At block 1020, a determination is made whether the training objective is met. In some embodiments, the determination at block 1020 is made by comparing the results of the artificial intelligent algorithm to the training objective initialized at block 1016. In some embodiments, where the training image data is separated into the training subset and the validation subset, the determination at block 1020 includes testing the model trained at block 1018 using the validation subset of the image data. If, at block 1020, a determination is made that the training objective is not met, then the method 1010 proceeds to block 1022 where the training objective and/or the constraints are updated. After the training objective and/or the constraints are updated at block 1022, the method 1010 returns to block 1018 where the model is trained using the updated training objective and/or constraints. If, at block 1020, a determination is made that the training objective is met, then the method 1010 proceeds to block 1024 where the artificial intelligent algorithm is stored. Storing the artificial intelligent algorithm may include storing the artificial intelligent algorithm in one or more memories in a computing device (e.g., a local computing device, a remote computing device, etc.).

Figure 19:
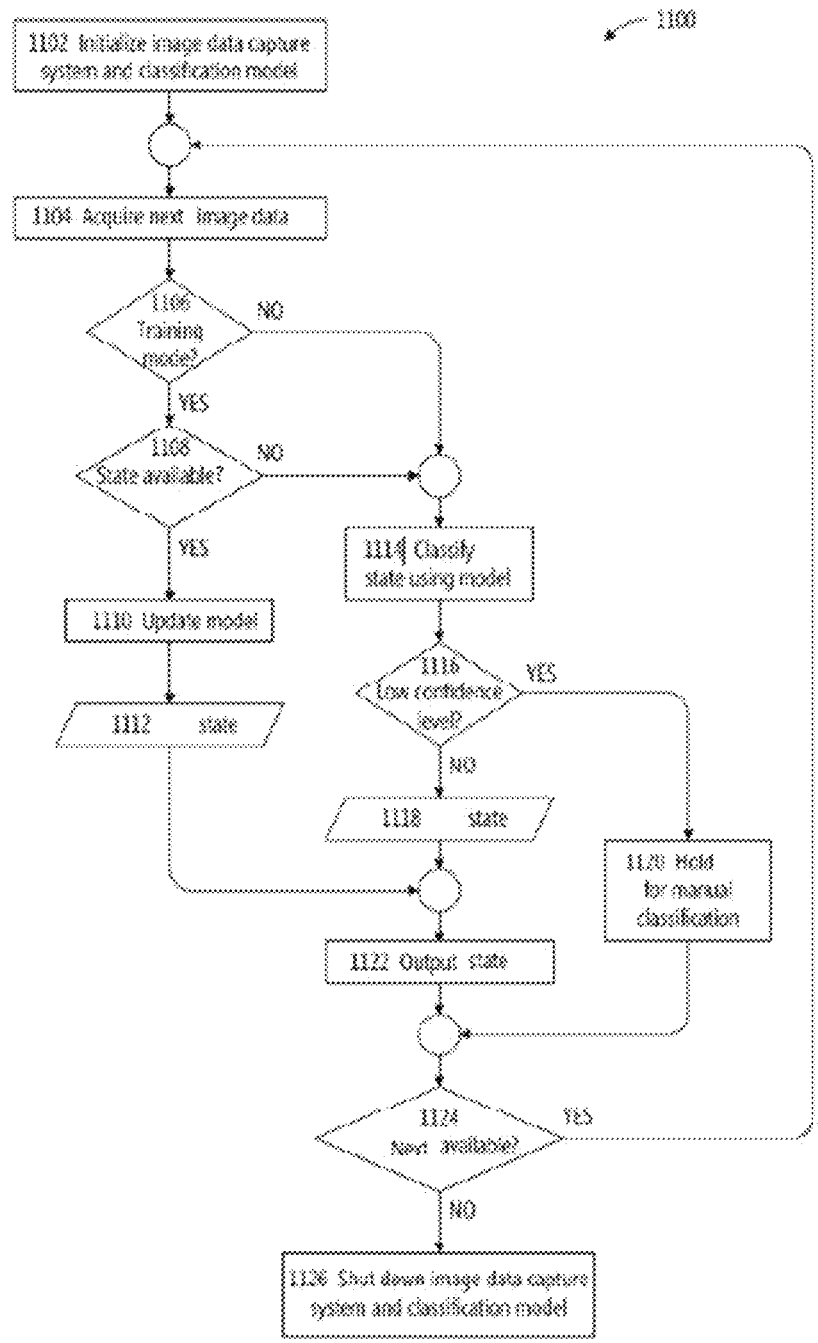
FIG. 19 is a flow sheet of a method for an image classification system to both train a model to classify seals and apply the artificial intelligent algorithm to classify states of a seal in accordance with an embodiment.

In some embodiments, a vision system may be used both to train a model to classify states of seal and to apply the artificial intelligent algorithm to classify states of seal. Depicted in FIG. 19 is an embodiment of a method 1100 for a vision inspection engine to both train a model to classify states of seals for packaging articles and apply the artificial intelligent algorithm to classify states of seals. In some embodiments, the vision system includes an image sensor system and a computing apparatus which may define a vision inspection engine 504 and an acquisition system 502. In those embodiments, the model may operate on the computing apparatus while the imaging device(s) obtains image data of the seal either for training or applying the model.

At block 1102, the vision system and the classification model are initialized. In some embodiments, initialization of the vision system includes initializing a computing apparatus and initializing imaging device(s), and initialization of the classification model includes loading launching software that includes the classification model on the computing apparatus. At block 1104, the image data of a seal is acquired (e.g., by imaging device(s) and acquisition system). In some embodiments, the imaging device(s) acquires the image data of the seal and provides the image data to the computing apparatus. At block 1106, a determination is made whether the classification model is in training mode. The determination may be made by the software operating on the computing system that includes the classification model.

If, at block 1106, a determination is made that the classification model is in training mode, then the model passes to block 1108, where a determination is made if a state is available for the seal. A state may be available for a seal when a user manually enters a state for the seal into a computing device or scans a state of the seal (e.g., from a bar code or other indicia on the training packaging article). If, at block 1108, a determination is made that a state is available, then the method proceeds to block 1110. At block 1110, the classification model is updated based on the image data and the state for the seal. Updating the classification model can include any of the methods described herein for training and/or developing classification models. The seal state (e.g., the manually-entered state) is available, as shown in block 1112. However, if, at block 1106, a determination is made that the classification model is not in training mode or if, at block 1108, a determination is made that a state is not available, then the method proceeds to block 1114.

At block 1114, the classification model classifies a state of the seal. In some embodiments, the state of a seal classified by the classification model includes a determination of whether the seal is defective (e.g., pleat or weak seal), is non-defective, or has a particular defect, and an indication of a degree of certainty as to whether the seal is defective, is non-defective, or has a particular defect. At block 1116, a determination is made whether a confidence level of the classified state is low or high. In some embodiments, the confidence level is a percentage representing the degree of certainty that the classified state of the seal is accurate and confidence level is low if the degree of certainty is below a predetermined percentage of an acceptable degree of certainty. For example, if the acceptable degree of certainty is 90%, then the classified state of the seal is deemed to be low if the degree of certainty of the classified state is below 90%. If, at block 1116, the confidence level is determined to not be low, then the seal state has been determined, as shown at block 1118. However, if at block 1116, the confidence level is determined to be low, then the method proceeds to block 1120 where the seal product is set aside for off-line and/or manual classification (e.g., classification by a user after visual inspection or physical testing separate from the production line). In embodiments where multiple vision systems are utilized, either redundant or different types (e.g. thermal and photoelasticity), the likelihood of increasing the confidence is improved.

If a state of the seal is available, either at block 1112 or at block 1118, then the method proceeds to block 1122. At block 1122, the state of the seal is output. In some embodiments, outputting the state of the seal includes one or more of displaying the state of the seal on a user interface output device, communicating the state of the seal via a communication interface to one or more external devices, or storing the state of the seal in a database. In some embodiments, the state of the seal includes one or more of an indication of whether the seal is defective, is non-defective, or has a particular defect, or a degree of certainty of whether the seal is defective, is non-defective, or has a particular defect.

Whether state of the seal is output at block 1122 or the packaging article is held for manual classification at block 1120, the method 1100 then proceeds to block 1124. At block 1124, a determination is made whether another packaging article is available. In some embodiments, the determination at block 1124 can be based on whether another packaging article is detected on the conveyor (e.g., via one or more sensors). In some embodiments, the determination at block 1124 can be based on whether a user inputs an indication whether another packaging article is available. If, at block 1124, a determination is made that another packaging article is not available, then, at block 1126, the vision system and the classification model are shut down. However, if, at block 1124, a determination is made that another packaging article is available, then the method 1100 loops back to block 1104 where image data is acquired of the seal of the next packaging article and the method 1100 proceeds from block 1104 as described above for the next packaging article.

Figure 21:
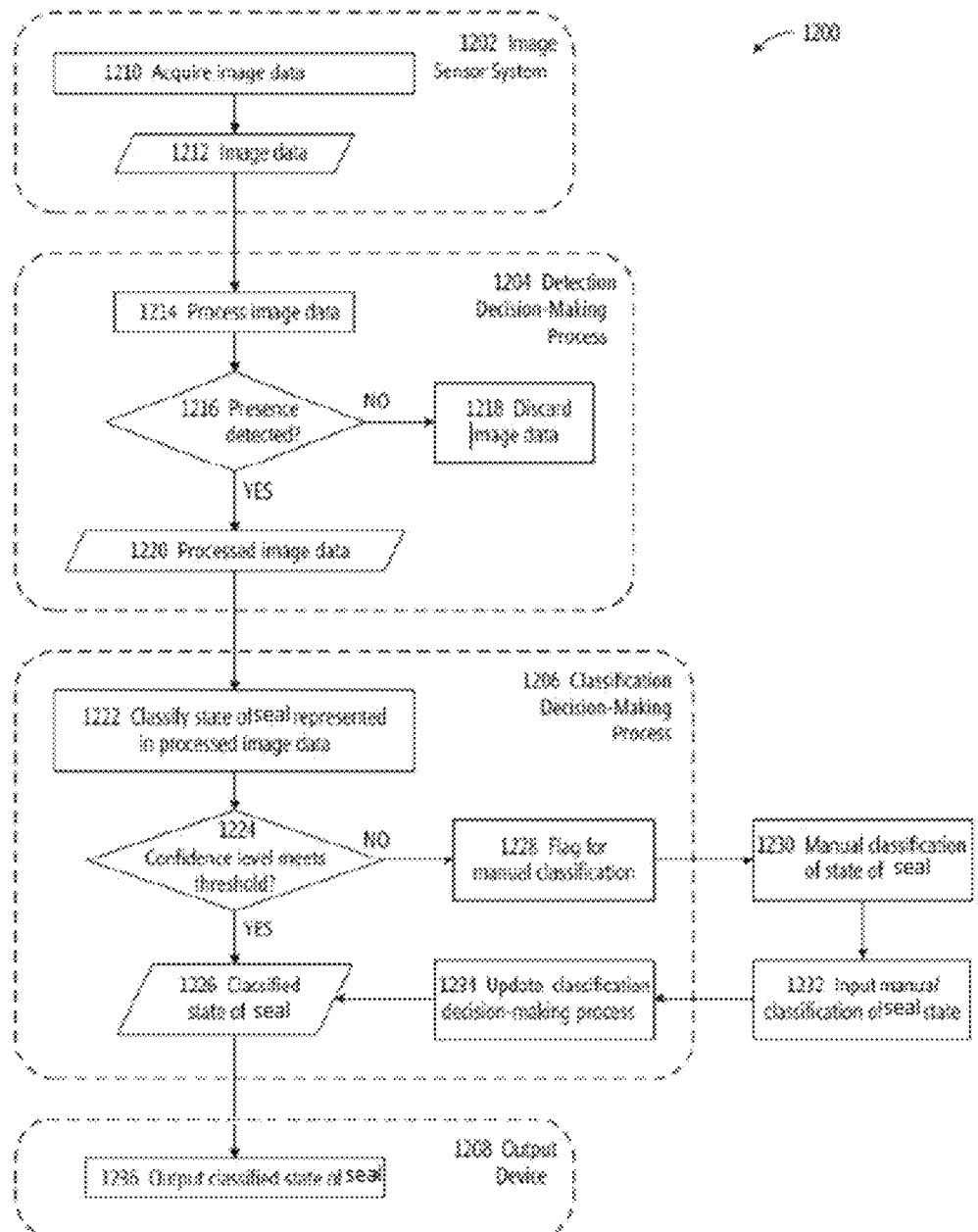
FIG. 21 is a flow sheet of a method of classifying a state of a seal in accordance with an embodiment.

As discussed above, an artificial intelligent algorithm to classify states of seals for packaging articles from image data may include one decision-making process, such as a decision tree or a neural network. In some embodiments, an artificial intelligent algorithm to classify states of seal from image data may include more than one decision-making process. Depicted in FIG. 21 is an embodiment of a method 1200 of classifying a state of a seal. In the depicted embodiment, the method 1200 is performed in part by an image sensor system 1202, a detection decision-making process 1204, a classification decision-making process 1206, and an output device 1208. At block 1210, the image sensor system acquires image data of a seal. In some embodiments, the image sensor system 1202 may acquire the image data as the packaging article is being transported by a transport system. After the image data is acquired at block 1210, the image sensor system has image data 1212 that can be communicated to the detection decision-making process 1204. In one embodiments, the detection decision-making process 1204 is a software-based decision-making process operating on one or more computing devices.

At block 1214, the detection decision-making process 1204 processes the image data received from the image sensor system 1202. In some embodiments, the processing of the image data at block 1214 is performed by an artificial intelligent algorithm that has been trained to detect a region of interest associated with a seal of a packaging article in image data. In some embodiments, the processing of the image data at block 1214 includes one or more of cropping an image in the image data around a detected seal or seals in the image, selecting a frame or a subset of frames from a video in the image data, identifying irrelevant pixels from an image in the image data and replacing the irrelevant pixels with the least significant values of the image data. In some embodiments, the processing of the image data produces a single image having a rectangular shape with the identified seal substantially centered in the image and the pixels deemed to be irrelevant being replaced with the least significant values. In some embodiments, the processing of the image data can include masking a portion of an image, where areas of the image outside of a region of interest (e.g., outside of the seal) are replaced with low value data (e.g., the pixels are all changed to black) to reduce the amount of processing to classify the state of the seal and reduce the likelihood of error when classifying the state of the seal.

In one embodiment of processing image data, a custom boundary is constructed around a representation of a seal in the image data. A bounding box encompassing the seal is also constructed in the custom boundary. The processing also includes cropping the bounding box from the entire image data. One advantage of cropping the image data based on the custom boundary is that the later classification of the state of the seal may be limited to areas of interest without the need to inspect areas of the image data that are not of interest. This may, in turn, increase the confidence level of classification and therefore overall performance of the classification. In some embodiments, where the detection decision-making process 1204 is a multilayer neural network, creating the bounding box around the custom boundary simplifies compatibility requirements between the image data and the first layer of the neural network. Additionally, cropping the image data results in a portion of the image data being processed for classification, rather than the entire image data, which reduces the processing time for classification. In some embodiments, the custom boundary may help in generating a numerical value for one or more of the area of the seal, its centroid, or its orientation.

At block 1216, a determination is made whether the presence of a seal is detected in the image data. In some embodiments, the determination made at block 1216 is a part of the processing of the image data at block 1216. In some embodiments, the determination of whether the seal is detected at block 1216 is a separate process from the processing of the image data at block 1216. If, at block 1216, a determination is made that the presence of seal is not detected, then the method 1200 proceeds to block 1218 where the image data is discarded (e.g., deleted) and the method 1200 ends. However, if, at block 1216, a determination is made that the presence of a seal is detected, then the processed image data represented at block 1220 can be communicated to the classification decision-making process 1206. In some embodiments, the classification decision-making process 1206 is a software-based decision-making process operating on one or more computing devices, which may be the same as or different from the one or more computing devices on which the detection decision-making process 1204 operates. In some embodiments, processing the image data at block 1214 to obtain the processed image data, as shown at block 1220, prior to classifying a state of the seal represented in the data increases the evaluation matrix of the later-performed classification by the classification decision-making process 1206.

At block 1222, the classification decision-making process 1206 classifies the processed image data received from the detection decision-making process 1204. In some embodiments, the classification of the image data at block 1222 is performed by an artificial intelligent algorithm that has been trained to classify a state of a seal represented in processed image data. In some embodiments, the classification of the state of the seal represented in the processed image data at block 1222 includes a determination of whether the seal is defective, is non-defective, or has a particular defect. In some embodiments, the classification of the state of the seal represented in the processed image data at block 1222 includes a determination of whether the seal is defective, is non-defective, or has a particular defect, and an indication of a degree of certainty as to whether the seal is defective, is non-defective, or has a particular defect.

At block 1224, a determination is made whether a confidence level of the classified state is low. In some embodiments, the confidence level is a percentage representing the degree of certainty that the classified state of the seal is accurate and the confidence level is low if the degree of certainty is below a predetermined percentage of an acceptable degree of certainty. For example, if the acceptable degree of certainty is 90%, then the classified state of the seal is deemed to be low if the degree of certainty of the classified state is below 90%. If, at block 1224, the confidence level is determined to not be low, then the seal state has been determined, as shown at block 1226. However, if at block 1224, the confidence level is determined to be low, then the method proceeds to block 1228 where the seal and/or the image data is flagged for manual classification.

At block 1230, a state of the seal is manually classified outside of the classification decision-making process. In some embodiments, the seal is manually classified by a user after visual inspection or physical testing of the packaging article. At block 1232, the user inputs the manually-classified state of the seal to the classification decision-making process 1206. At block 1234, the classification decision-making process 1206 is updated. In embodiments where the classification decision-making process 1206 is an artificial intelligent algorithm, updating the classification decision-making process 1206 includes further training the artificial intelligent algorithm based on the manual classification. After updating the classification decision-making process 1206, the method 1100 returns to block 1226 where the classified state of the vacuum-packaged product is the manually-classified state of the seal.

After the classified state of the vacuum-packaged product, as represented at block 1226, is classified or obtained by the classification decision-making process 1206, the classification decision-making process 1206 sends the classified stated of the seal to the output device 1208. In the embodiments where the classification decision-making process 1206 is software operating on one or more computing devices, the output device 1208 can be a user interface output device. In some embodiments, the outputting the classified state of the seal at block 1236 includes one or more of outputting the classified state of the seal to a user via a user interface (e.g., a monitor, a touchscreen, etc.), communicating the classified state of the seal to an external device via a communications circuitry, or locally storing the classified state of the seal in a database.

In any of the embodiments disclosed herein, the image data received for any one seal may include multiple forms of image data about the same seal. For example, image data about a seal may include two images in the visible light range of the same seal. In another embodiment, image data about a seal may include three images, one being a thermography image, one being an ultraviolet image and one be a photoelasticity image. These multiple different forms of image data for the same seal may be passed through an artificial intelligent algorithm separately. If the artificial intelligent algorithm returns the same classified state for the seal using multiple different forms of image data, then the confidence level of the classification for that seal can be increased significantly. In one example, if the artificial intelligent algorithm classified one of the images as having a packaging article with an imperfect seal at a 98% confidence level and classified the other image as having a packaging article with an imperfect seal at a 96% confidence level, then the confidence level that the packaging article has an imperfect seal may be greater than 99%. In another example, if the artificial intelligent algorithm classified one of the images as having a non-defective seal at a 60% confidence level and classified the other image as having a non-defective seal at a 70% confidence level, then the confidence level that the vacuum-packaged product is non-defective may be 88%. Even though the confidence level using two images may be significantly higher than either of the images alone, the combined confidence level from two images (e.g., 88%) may still be below a predetermined percentage of an acceptable degree of certainty (e.g., 95%), which may cause the packaging article to be flagged for manual classification. In some further embodiments, multiple camera angles may be used to image the seal on multiple surfaces and from multiple viewpoints, such as through the packaging article, at an angle from the packaging article or directly above the packaging article. In some embodiments, two or more camera angles to image the same seal may be used. It will be apparent that the number of multiple forms of image data is not limited to two, but could be any number of forms of image data.

In some embodiments, not every area of increased or altered image indicators or defects is necessary in detection and reporting, and a user or the computer apparatus may determine one or more thresholds to facilitate identification of a defective seal. The threshold may be based on any of the parameters detailed herein and may be predetermined or applied as the result of an algorithm or model. A threshold value can be set so that only altered image indicators and defects above the threshold size are flagged for removal. For example, the threshold can be set at a fluorescent region having a size of at least 2 millimeters in at least one direction (i.e., an altered fluorescence having a size of at least 2 millimeters in the machine direction and/or at least 2 mm in the transverse direction). Alternatively, the threshold can be set to a thermal image abnormality of at a size of at least 1 millimeter in at least one direction, (i.e., an altered fluorescence of at least 1 millimeter in at least one direction). In some embodiments, a threshold value can be set at a predetermined surface area (e.g., an area of at least 1 $mm_2$, 2 $mm_2$, 3 $mm_2$, or 4 $mm_2$). Such a threshold can be set even if the system has the capability to see defects down to a size of as low as 10 microns in at least one direction. The setting of the threshold value is different from the capability of the machine vision system to detect a defect to at least a particular size in at least one direction. Rather, the setting of the threshold value is the setting of the minimum value of the size of the area which trigger the generation of the signal in response thereto. That threshold can be set at any desired value, and is different from the capability of the machine vision system to detect defects down to at least a specified size.

In some embodiments, the algorithmic or model-based detecting means disclosed herein may be used to detect defects in the packaging article. For example, in some embodiment, the algorithmic or model-based detecting means described herein may detect an area of high fluorescence that is higher than the majority of the seal, which may indicate a pleat or other defect in the seal. In some embodiments, the algorithmic or model-based detecting means may detect a substantially even, constant fluorescence from the seal, indicating a strong seal. In some embodiments, areas of less or no fluorescence in the region of the seal may indicate a discontinuity or weakness in the seal.

In some embodiments, the algorithmic or model-based detecting means disclosed herein may be used to detect defects in the packaging article. For example, in some embodiment, the algorithmic or model-based detecting means described herein may detect an area of high thermal radiation concentration that is higher than the majority of the seal, which may indicate a pleat or other defect in the seal. In some embodiments, the algorithmic or model-based detecting means may detect a substantially even, constant thermal image from the seal, indicating a strong seal. In some embodiments, areas of less or no thermal radiation in the region of the seal may indicate a discontinuity or weakness in the seal.

In some embodiments, the algorithmic or model-based detecting means disclosed herein may be used to detect defects in the packaging article. For example, in some embodiment, the algorithmic or model-based detecting means described herein may detect a visible defect under photoelastic images.

Examples

In an example embodiment, the algorithm and image processing may comprise some or all of the following steps: (1) capture an image; (2) apply de-noising to the image; (3) convert the image to greyscale; (4) apply thresholding to reduce the section of the image for consideration; (5) eliminate undesired areas of the image; (6) identify features in the remaining image corresponding to a faulty seal in the packaging article. Examples of each of these processing steps are shown and described in the following figures.

Figure 22:
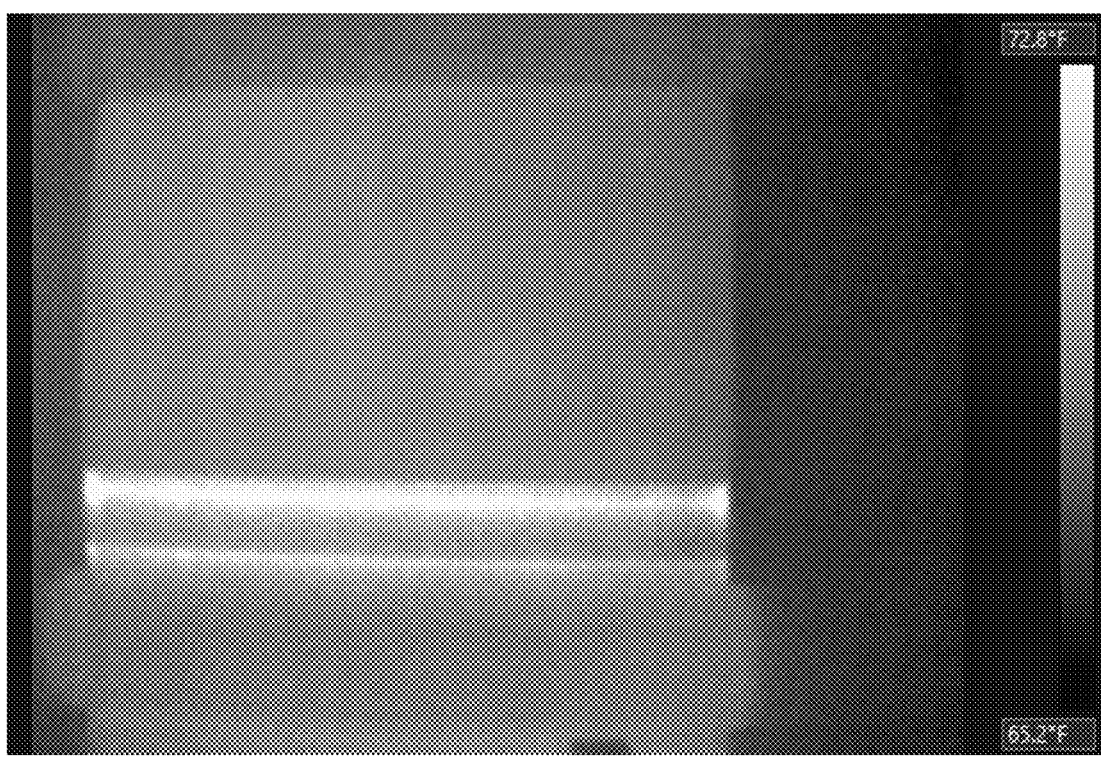
FIG. 22 is a thermography images showing an acceptable seal.
Figure 23:
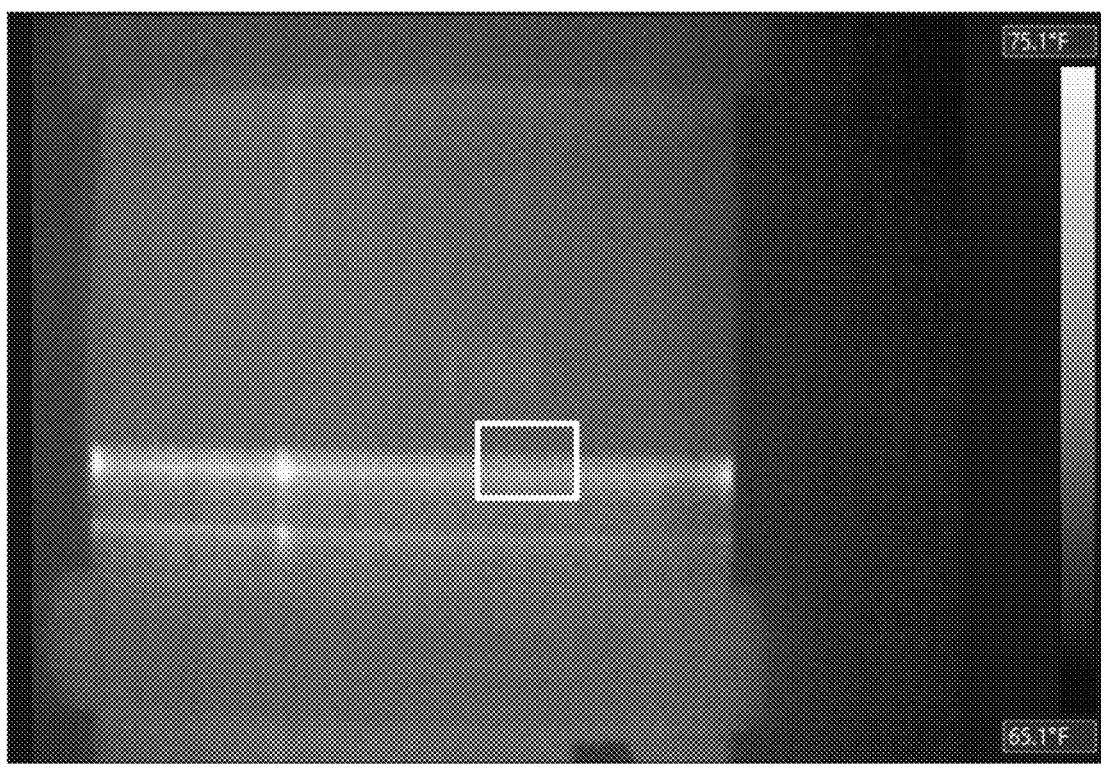
FIG. 23 is an image views of thermography images showing a faulty seal.

Turning to FIG. 22, thermal image data of a sufficient seal is shown. An impulse seal was formed in a packaging article. Impulse seals are known to create non-linear or wavy seal areas. The image was captured 5 seconds after seal creation. A uniform active cooling was utilized after sealing and prior to image capture. Such a sufficient seal image can be used for the artificial intelligent algorithm as good seal images. FIG. 23 is exemplary image of thermal image data of a faulty seal. An impulse seal was formed in a packaging article. The image was captured 5 seconds after seal creation. A uniform active cooling was utilized after sealing and prior to image capture. The image, and similar faulty seal images can be used to train the artificial intelligent algorithm to demonstrate defects or insufficient seals.

FIG. 23 is an exemplary thermal image showing double straight seal with a localized seal pleat. An impulse seal was formed in a packaging article. The image was captured 5 seconds after seal creation. A uniform active cooling was utilized after sealing and prior to image capture. The discontinuity in the thermal image along the seal area demonstrate a cold and weak seal. Such images are useful in training the artificial intelligent algorithm as described herein.

Figure 24:
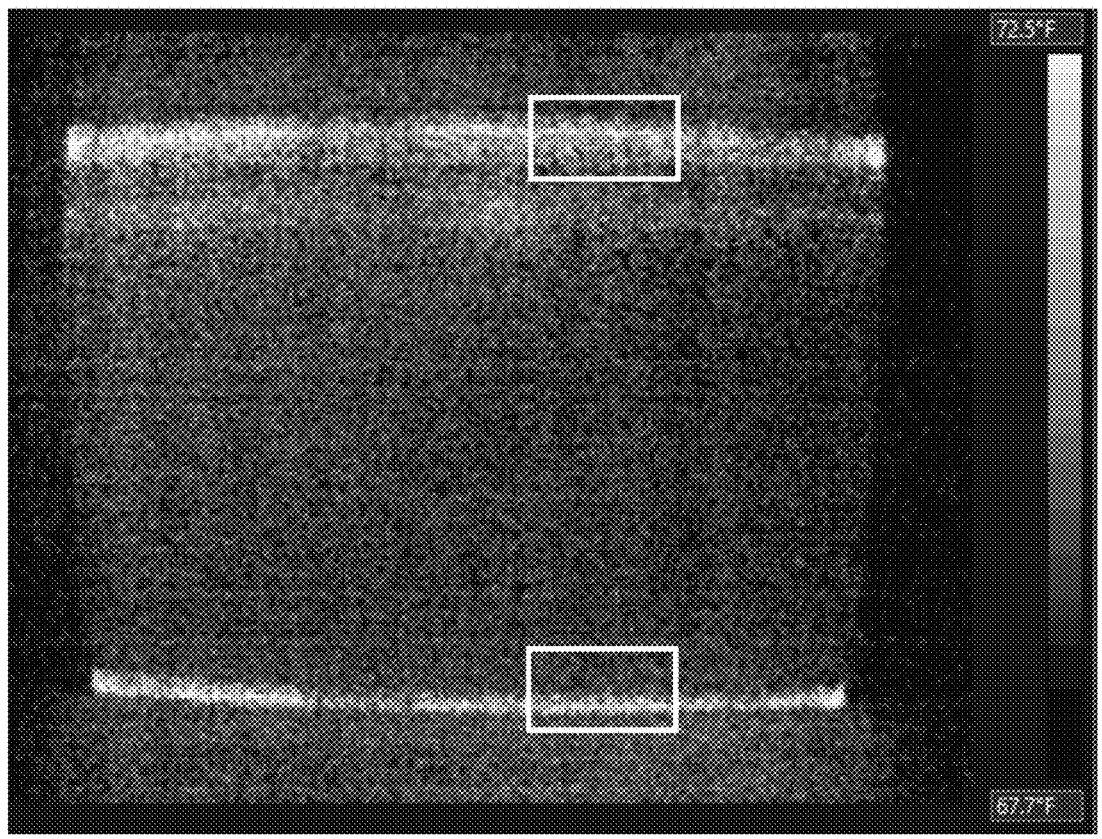
FIG. 24 is an image view of a thermography image showing a faulty seal.

FIG. 24 is an exemplary thermal image showing a double straight seal with a weak seal area. An impulse seal was formed in a packaging article. The image was captured 5 seconds after seal creation. A uniform active cooling was utilized after sealing and prior to image capture. The discontinuity in the thermal image along the seal area demonstrate a cold and weak seal. Such images are useful in training the artificial intelligent algorithm as described herein.

Figure 25:
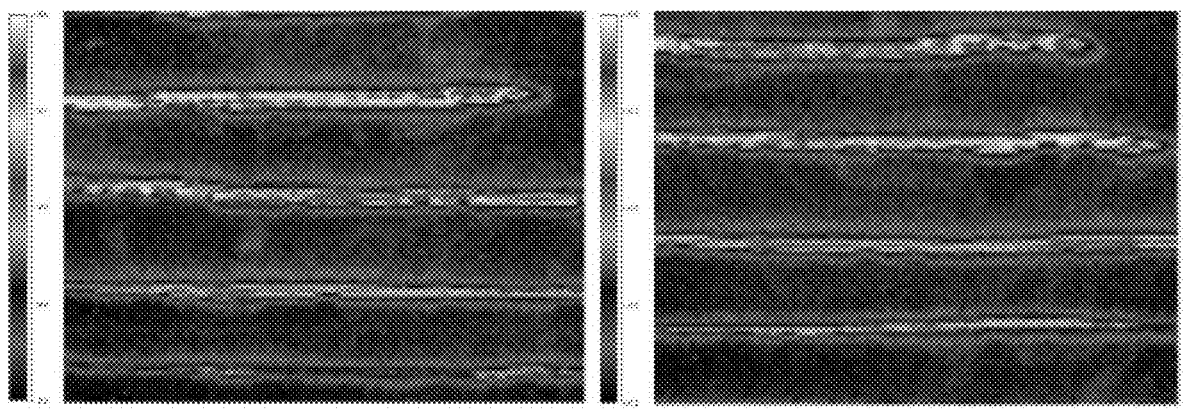
FIG. 25 is an image view of a thermography image showing acceptable seals.
Figure 26:
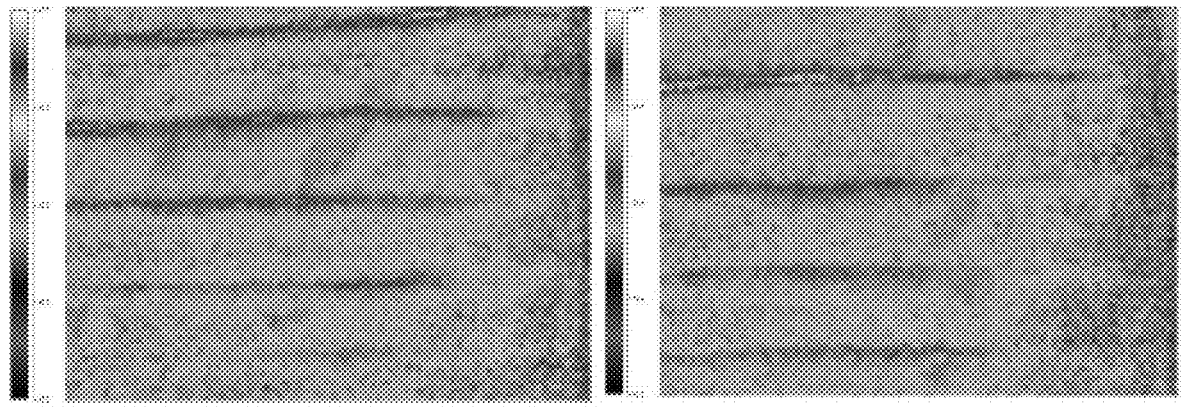
FIG. 26 is an image view of a thermography image showing acceptable seals.

Turning now to FIGS. 25 and 26 there is shown thermal image data images demonstrating an acceptable seal. FIGS. 25 and 26 are taken of the same seals at two distinct locations and two distinct points in time. The seal area emits a fairly consistent thermal radiation along the seal without any hot or cold spots or areas. The heat in the seal area is residual heat from the sealing process and dissipates over time. FIG. 25 is an image taken 15 s after the heat sealing process. FIG. 26 is an image taken 20 s after the heat sealing. The time for capturing the thermal image after heat sealing can be adjusted depending on the film, packaging article, thickness of the film, heat seal temperature and method.

Figure 27:
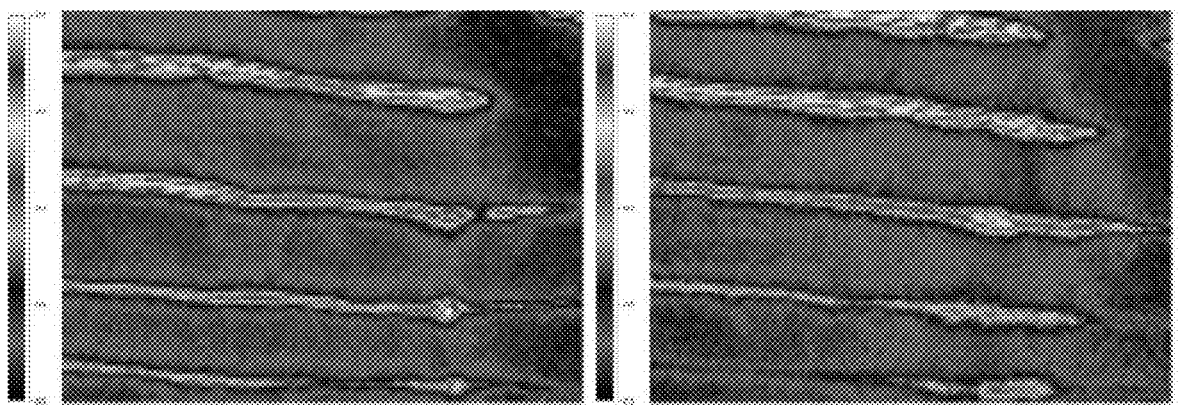
FIG. 27 is an image view of a thermography image showing faulty seal areas.
Figure 28:
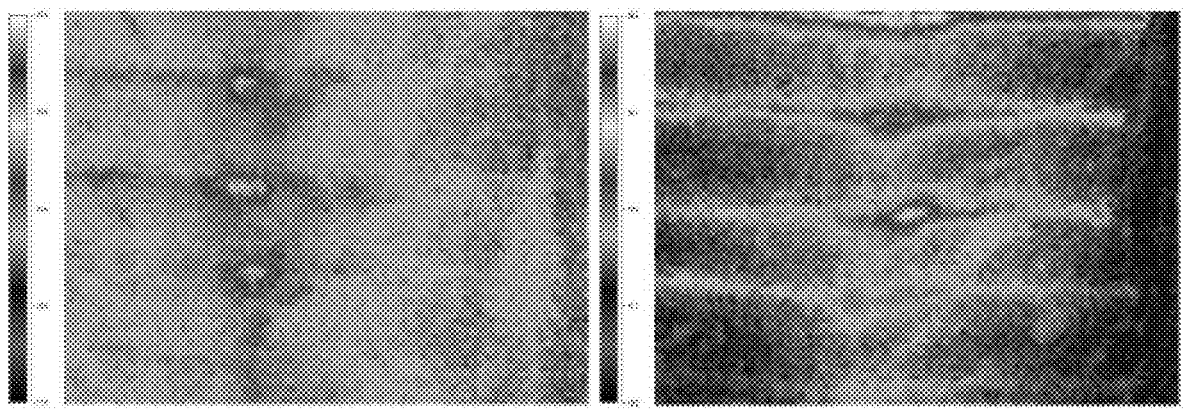
FIG. 28 is an image view of a thermography image showing faulty seal areas.

Referencing FIGS. 27 and 28 there is shown thermal image data images demonstrating a defective seal. FIGS. 25 and 26 are taken of the same seals at two distinct locations and two distinct points in time. The seal area emits a fairly consistent thermal radiation along the seal with the exception of the hot spots 3101, 3102, 3201 and 3202. The heat in the seal area is residual heat from the sealing process and dissipates over time. FIG. 27 is an image taken 15 s after the heat sealing process. FIG. 28 is an image taken 20 s after the heat sealing. The time for capturing the thermal image after heat sealing can be adjusted depending on the film, packaging article, thickness of the film, heat seal temperature and method.

Figure 29:
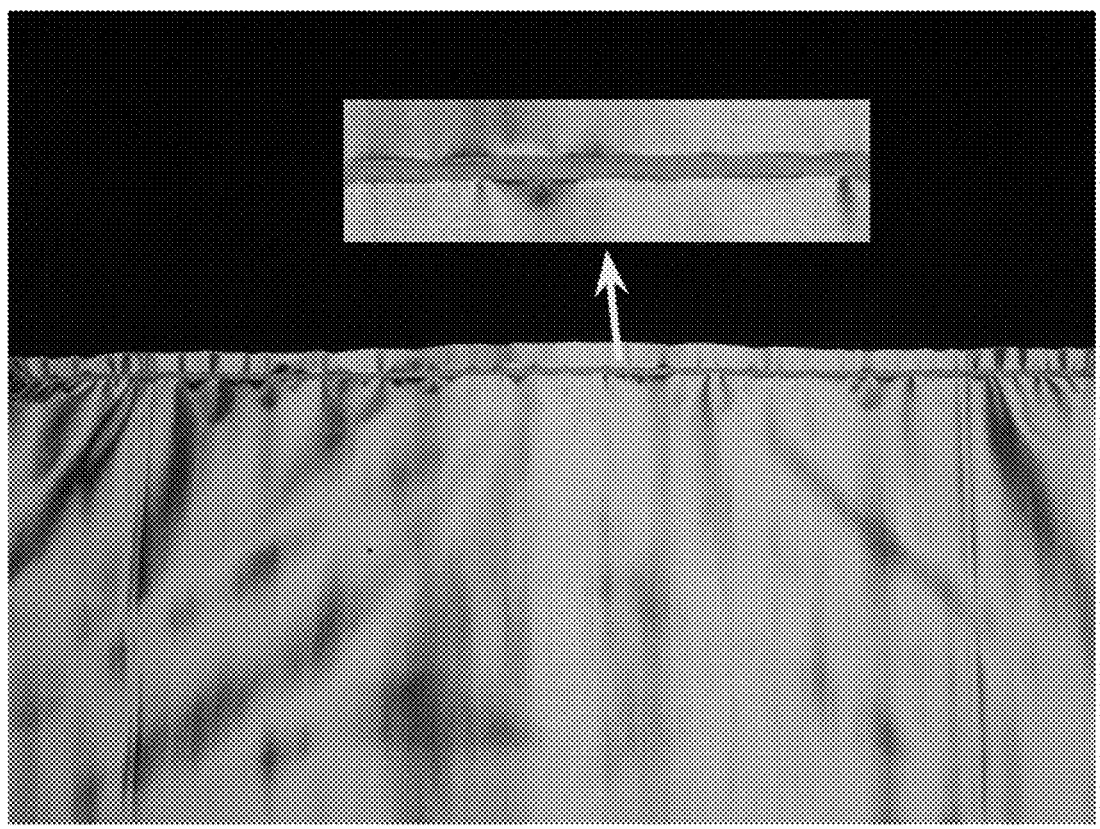
FIG. 29 is an image view of a photoelasticity image showing an acceptable seal.

Turning now to FIG. 29 is shown a seal area captured by a photoelasticity imaging system, such as described herein. The photoelasticity image capture mechanism provides enhanced vision capabilities as compared to standard image capture techniques. FIG. 29 demonstrates an adequate seal without any defects.

Figure 30:
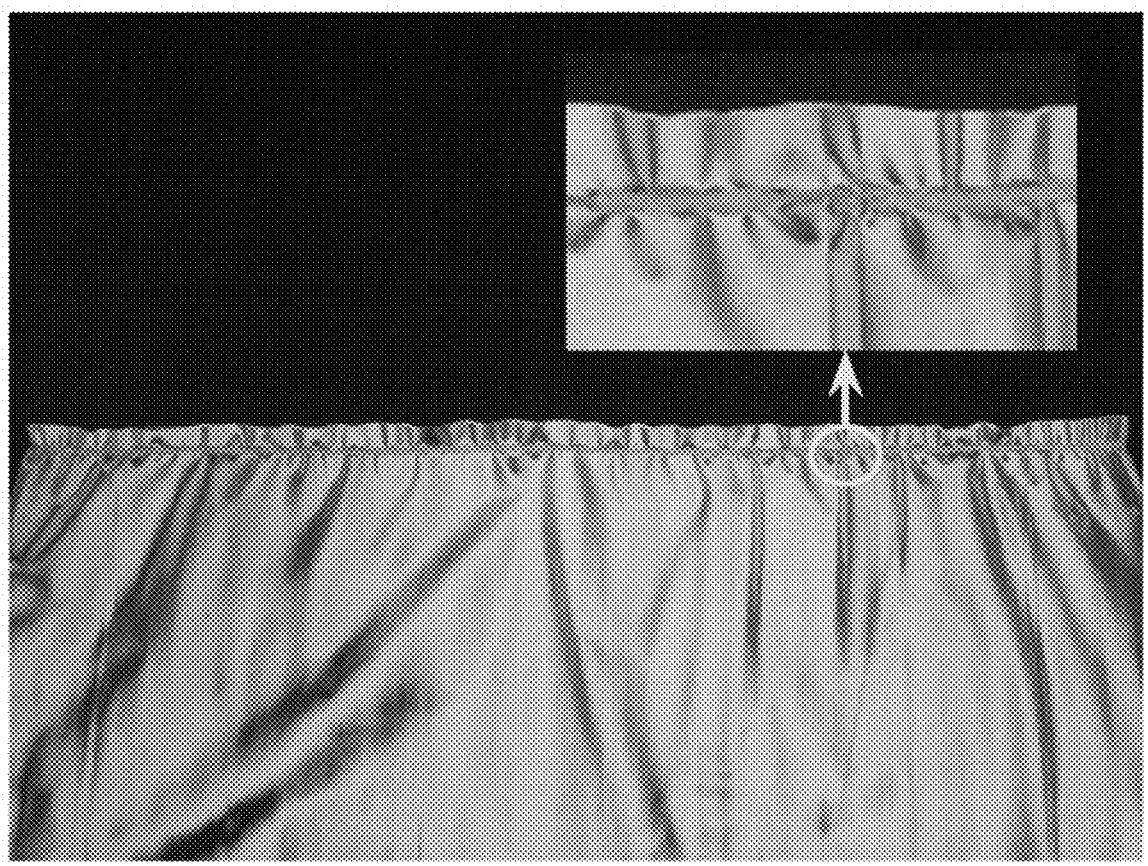
FIG. 30 is an image view of a photoelasticity image showing a faulty seal.
Figure 31:
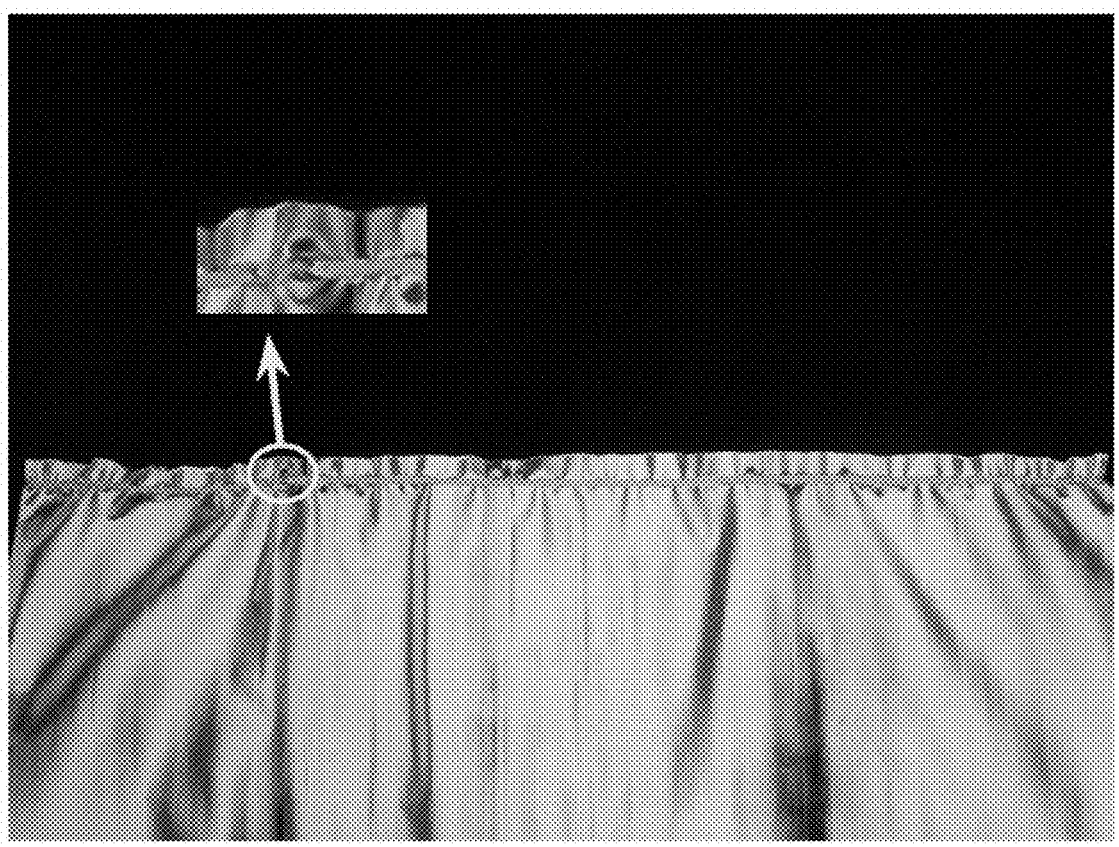
FIG. 31 is an image view of a photoelasticity image showing a faulty seal.

FIGS. 30 and 31 demonstrate seal areas captured by a photoelasticity imaging system. The images improve the definition of the pleat defects as compared to standard imaging. The vision inspection engine analyzes the image for variations in adjacent pixels color gradients, section comparison and the like. The vision inspection engine may compare a number of pixels, or sections of images one or more of the following: mean, variable, skew, minimum, maximum, range or variations in the seal area. Variations between pixels or section of the image can be indicative of a seal defect.

Figure 32:
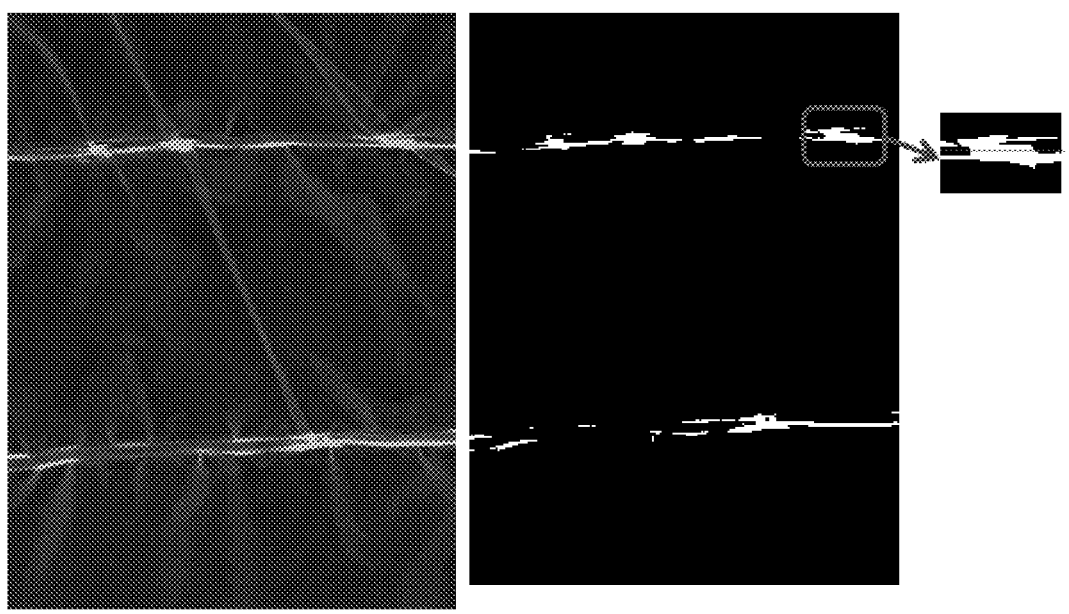
FIG. 32 is an image view of an ultraviolet image showing a faulty seal.

FIG. 32 demonstrates an ultraviolet image taken of a packaging article having an optical brightener disposed therein. The optical brightener fluoresces with more intensity at the seal areas containing pleat defects. Additional material is bunched around the pleat defects causing additional illumination intensity. The vision inspection engine analyzes the image for variations in adjacent pixels color gradients, section comparison and the like. The vision inspection engine may compare a number of pixels, or sections of images one or more of the following: mean, variable, skew, minimum, maximum, range or variations in the seal area. Variations between pixels or section of the image can be indicative of a seal defect.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A process for monitoring seal quality of a packaging article, comprising:
    A) heat sealing a polymeric film to itself, or another polymeric multilayer film to form a packaging article by forming at least one seal area; the polymeric film having a total free shrink in either of the machine direction or the transverse direction, of at least 10 percent measured at 85° C. and according to ASTM D2732;
    B) acquiring a first set of image data of the at least one seal area with a first vision system comprising an image capture device; the first set of image data being acquired in-line with the forming of the packaging article and prior to pack off of the packaging article, the first vision system being a thermography vision system comprising an infrared imaging device capable of capturing a temperature distribution based on the amount of infrared radiation emitted from the seal area, wherein the first set of image data is time-delayed thermography data captured between 2 and 30 seconds after the forming of the at least one seal area;
    C) acquiring a second set of image data of the at least one seal area with a second vision system, which is distinct from the first vision system, the second set of image data being acquired in-line with the forming of the packaging article and prior to pack off of the packaging article, the second vision system comprising:
        a. a first linear polarizer having a direction of polarization oriented in a first direction;
        b. a second linear polarizer have a direction of polarization oriented orthogonal to the first direction;
        c. a light source; and
        d. an imaging device to capture the second set of image data, the second set of image data being photoelastic image data
    D) assessing the first and second image data of the seal area with a vision inspection engine to verify both the continuity and strength of the seal area.

2. The process according to claim 1, wherein the forming at least one seal area is formed by a heat generated seal.

3. The process according to claim 1, wherein the film comprises at least one layer containing a fluorescence-based indicator.

4. The process according to claim 3, wherein the vision system is an ultraviolet vision system further comprising an ultraviolet light source.

5. The process according to claim 3, wherein the ultraviolet vision system further comprises a white light source.

6. The process according to claim 3, further comprising the steps of:
    A) exposing the packaging article to incident radiation to excite the fluorescence-based indicator so that the fluorescence-based indicator fluoresces;
    B) acquiring image data of the fluorescence emitted from the seal area by the packaging article, while the indicator is fluorescing.

7. The process of claim 6, wherein the fluorescence-based indicator comprises at least one member selected from the group consisting of ultraviolet-indicator, infrared-indicator, dye, pigment, optical brightener, fluorescent whitening agent, 2,2'-(2,5-thiophenylenediyl)bis(5-tert-butylbenzoxazole), hydroxyl-4-)p-tolylamino)anthracene-9,10-dione, 2,5-thiophenediylbis(5-tert-butyl-1,3-benzoxazole), and anthraquinone dyestuff.

8. The process according to claim 6, wherein the vision inspection engine comprises a computing apparatus comprising computer executable instructions configured to determine whether fluorescent electromagnetic energy emitted by the excited fluorescence-based indicator is indicative of a defective seal.

9. The process of claims 8 wherein the computer executable instructions comprise at least one artificial intelligence algorithm selected from the group of supervised, unsupervised or semi-supervised methodology.

10. The process according to claim 6, wherein determining that the seal is defective comprises determining at least one of (i) that the film exhibits a higher or lower intensity of fluorescence in a first region of the seal, relative to a second region of the seal, (ii) that the film exhibits a higher or lower intensity of fluorescence in a first region of the seal, relative to an expected level fluorescence, or (iii) both (i) and (ii).

11. The process according to claim 1, wherein the first vision system is a thermography vision system comprising an infrared imaging device; and further comprising a third vision system is an ultraviolet vision system comprising an ultraviolet light source.

12. The process according to claim 1, further comprising third image data being ultra violet fluorescence emitted image data.

13. The process according to claim 1, wherein either the first or second image data of the at least one seal area is captured by the image capture device at a speed of at least 5 images per second.

14. The process according to claim 1, wherein the vision inspection engine assigns a seal score value to the at least the first or second image data of the seal area.

15. A system for detecting a defective seal of a packaging article comprising:
- A) a heat sealing mechanism configured to seal a polymeric film to itself, or another polymeric multilayer film to form a packaging article by forming at least one seal area; the polymeric film having a total free shrink in either of the machine direction or the transverse direction, of at least 10 percent measured at 85° C. and according to ASTM D2732;
- B) a first vision system comprising an image capture device configured to acquire a first set of image data of the at least one seal area; the first set of image data being acquired in-line with the forming of the packaging article and prior to pack off of the packaging article, the first vision system being a thermography vision system comprising an infrared imaging device capable of capturing a temperature distribution based on the amount of infrared radiation emitted from the seal area, wherein the first set of image data is time-delayed thermography data captured between 2 and 30 seconds after the forming of the at least one seal area;
- C) a second vision system comprising an image capture device configured to acquire a second set of image data of the at least one seal area; the second vision system which is distinct from the first vision system, the second set of image data being acquired in-line with the forming of the packaging article and prior to pack off of the packaging article, the second vision system comprising:
  - a. a first linear polarizer having a direction of polarization oriented in a first direction;
  - b. a second linear polarizer have a direction of polarization oriented orthogonal to the first direction;
  - c. a light source; and
  - d. an imaging device to capture the second set of image data, the second set of image data being photoelastic image data
- D) assessing the first and second image data of the seal area with a vision inspection engine to verify both the continuity and strength of the seal area.

* * * * *